United States Patent
Kojima et al.

(10) Patent No.: US 9,689,457 B2
(45) Date of Patent: Jun. 27, 2017

(54) TORQUE ROD AND ENGINE MOUNTING SYSTEM FOR USING SAME

(75) Inventors: Hiroshi Kojima, Kounan-ku (JP);
Yukihiro Sugimoto, Fujisawa (JP);
Akira Ueki, Kamakura (JP); Humiharu Kurose, Kakogawa (JP); Takanobu Sugiyama, Yokohama (JP); Yoshiyasu Kimura, Yokohama (JP); Masahiko Kondo, Yokohama (JP); Yuusuke Satou, Ebina (JP)

(73) Assignees: BRIDGESTONE CORPORATION, Chuo-ku, Tokyo (JP); NISSAN MOTOR CO., LTD., Yokohama-Shi, Kanagawa (JP)

( * ) Notice: Subject to any disclaimer, the term of this patent is extended or adjusted under 35 U.S.C. 154(b) by 509 days.

(21) Appl. No.: 13/818,382

(22) PCT Filed: Aug. 23, 2011

(86) PCT No.: PCT/JP2011/004680
§ 371 (c)(1),
(2), (4) Date: Aug. 28, 2013

(87) PCT Pub. No.: WO2012/026111
PCT Pub. Date: Mar. 1, 2012

(65) Prior Publication Data
US 2013/0328254 A1   Dec. 12, 2013

(30) Foreign Application Priority Data

Aug. 23, 2010 (JP) .................. 2010-185725
Aug. 23, 2010 (JP) .................. 2010-185728
(Continued)

(51) Int. Cl.
*F16F 5/00* (2006.01)
*F16F 15/02* (2006.01)
(Continued)

(52) U.S. Cl.
CPC .......... *F16F 15/022* (2013.01); *B60K 5/1208* (2013.01); *B60K 5/1241* (2013.01);
(Continued)

(58) Field of Classification Search
CPC ...... F16F 15/022; F16F 1/3849; F16F 7/1011;
B60K 5/1208; B60K 5/1241; B60K 5/1216; B60K 5/04
(Continued)

(56) References Cited

U.S. PATENT DOCUMENTS 4,610,420 A * 9/1986 Fukushima et al. .......... 248/550
4,709,779 A * 12/1987 Takehara ...................... 180/300
(Continued)

FOREIGN PATENT DOCUMENTS

| CN | 100590000 C | 2/2010 |
|---|---|---|
| JP | 61-12436 A | 1/1986 |

(Continued)

OTHER PUBLICATIONS

International Search Report for PCT/JP2011/004680, dated Nov. 15, 2011.
(Continued)

Primary Examiner — Pamela Rodriguez
(74) Attorney, Agent, or Firm — Kenja IP Law PC

(57) ABSTRACT

A torque rod (1) has two elastic bushes (2, 3) to be mounted respectively to a vibration-generating side and a vibration-receiving side, and a connecting rod (4) connecting the two elastic bushes (2, 3). The actively controlled vibration cancellation means (5) is an actuator including: the shaft (5a) having two opposite ends mounted to the connecting rod (4) and extending in an axial direction of the connecting rod (4), the mass member (5b) shaped in a tube to surround the shaft (5a); a coil (5e) and a winding core (5f) fixed to the shaft (5a) in the tube-shaped mass member (5b); a permanent magnet (5d) mounted to an inner peripheral surface of the tube-shaped mass member (5b) or the shaft (5a), and a
(Continued)

connecting member (5c) for connecting at least one end of the tube-shaped mass members (5b) to the shaft (5a).

21 Claims, 32 Drawing Sheets

(30) Foreign Application Priority Data

Aug. 23, 2010 (JP) .................................. 2010-185729
Sep. 9, 2010 (JP) .................................. 2010-202281

(51) Int. Cl.
    *F16F 1/38* (2006.01)
    *F16F 7/10* (2006.01)
    *B60K 5/04* (2006.01)
    *B60K 5/12* (2006.01)

(52) U.S. Cl.
    CPC .......... *F16F 1/3849* (2013.01); *F16F 7/1011* (2013.01); *B60K 5/04* (2013.01); *B60K 5/1216* (2013.01)

(58) Field of Classification Search
    USPC ............................ 267/140.11, 140.14, 140.15
    See application file for complete search history.

(56) References Cited

U.S. PATENT DOCUMENTS

| | | | |
|---|---|---|---|
| 5,364,061 A * | 11/1994 | Ciolczyk et al. | 248/610 |
| 6,340,080 B1 * | 1/2002 | Carlson | 188/267.2 |
| 6,406,010 B1 * | 6/2002 | Yano et al. | 267/140.14 |
| 2004/0017033 A1 | 1/2004 | Ichikawa et al. | |
| 2009/0039577 A1 * | 2/2009 | Ishiguro et al. | 267/140.13 |
| 2009/0079114 A1 * | 3/2009 | Muraoka | 267/121 |
| 2010/0038195 A1 * | 2/2010 | Kojima | 188/267.1 |
| 2012/0098177 A1 * | 4/2012 | Satou et al. | 267/140.14 |
| 2014/0124645 A1 * | 5/2014 | Satou et al. | 248/638 |

FOREIGN PATENT DOCUMENTS

| | | | |
|---|---|---|---|
| JP | 2000-304094 A | | 10/2000 |
| JP | 2000304094 | * | 10/2000 |
| JP | 2005-188575 A | | 7/2005 |
| JP | 4241478 B2 | | 3/2009 |
| JP | 2009-243548 A | | 10/2009 |

OTHER PUBLICATIONS

Chinese Office Action, dated Jul. 2, 2014, issued in corresponding Chinese Patent Application No. 201180051115.8.
Japanese Office Action, dated Jul. 22, 2014, issued in corresponding Japanese Patent Application No. 2010-185725.
Japanese Office Action, dated Jan. 7, 2014, issued in corresponding Japanese Patent Application No. 2010-185729.
Japanese Office Action, dated Jan. 7, 2014, issued in corresponding Japanese Patent Application No. 2010-185728.
Extended European Search Report, dated Jan. 27, 2014, issued in corresponding European Patent Application No. 11819587.4.

* cited by examiner

FIG. 21
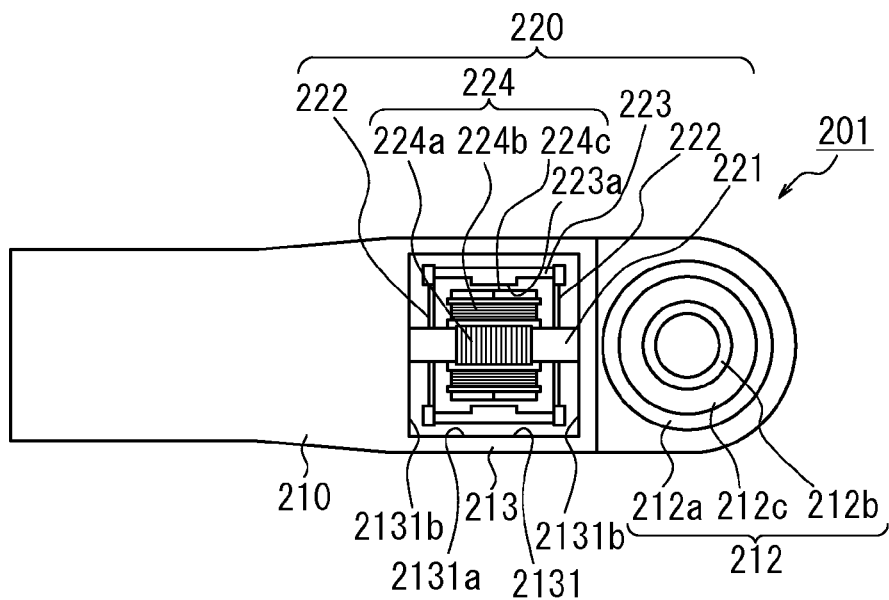
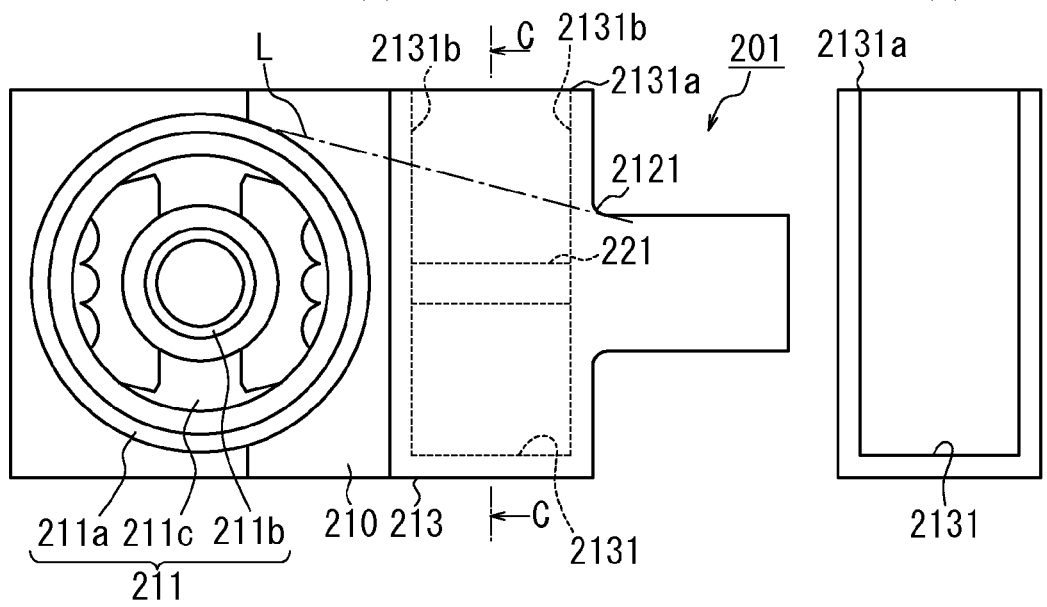

FIG. 29
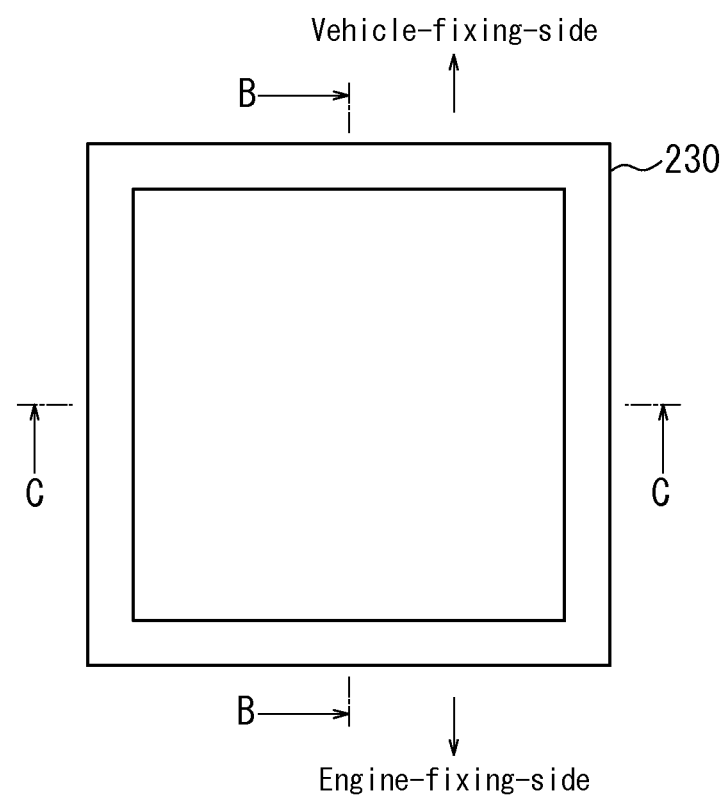
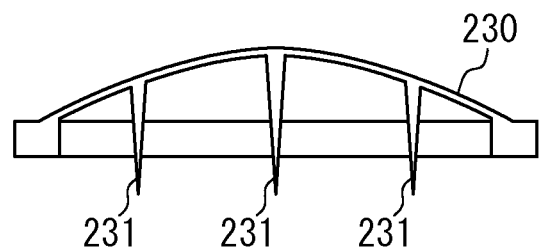

FIG. 31
(A)
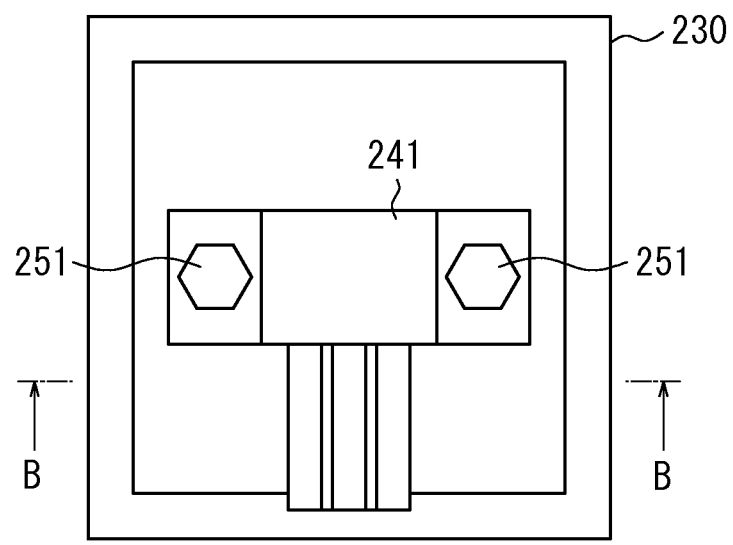
(B)
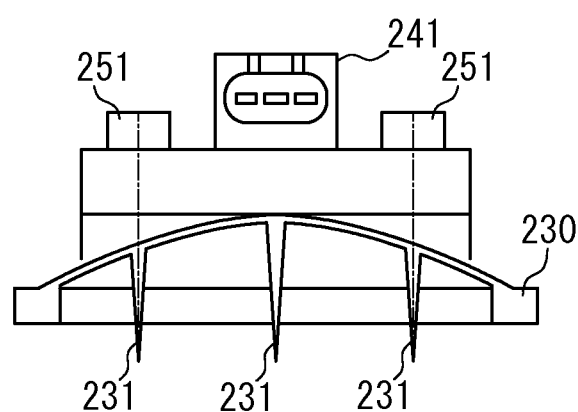

FIG. 32
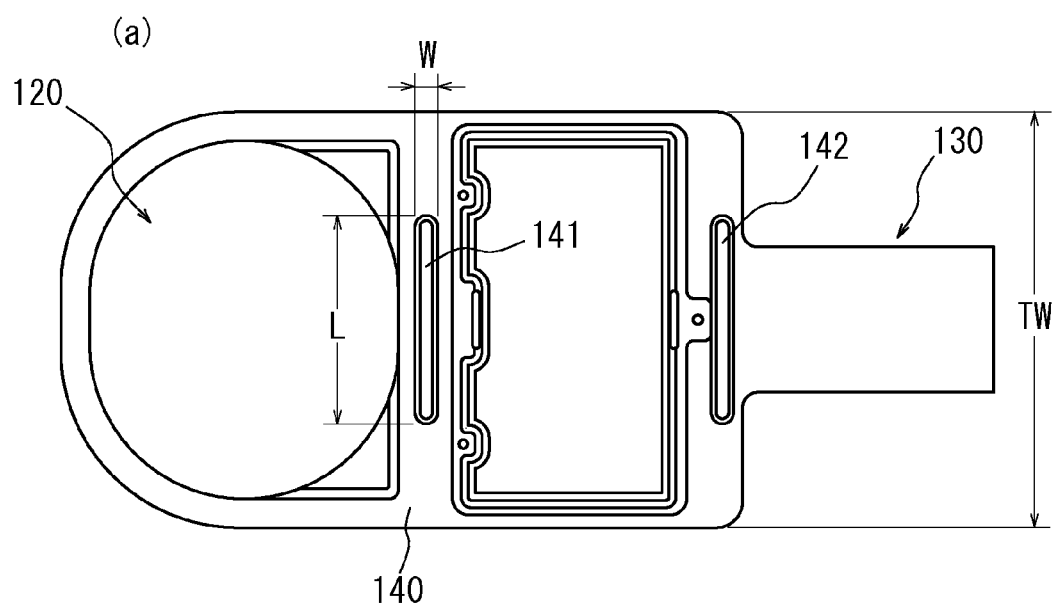
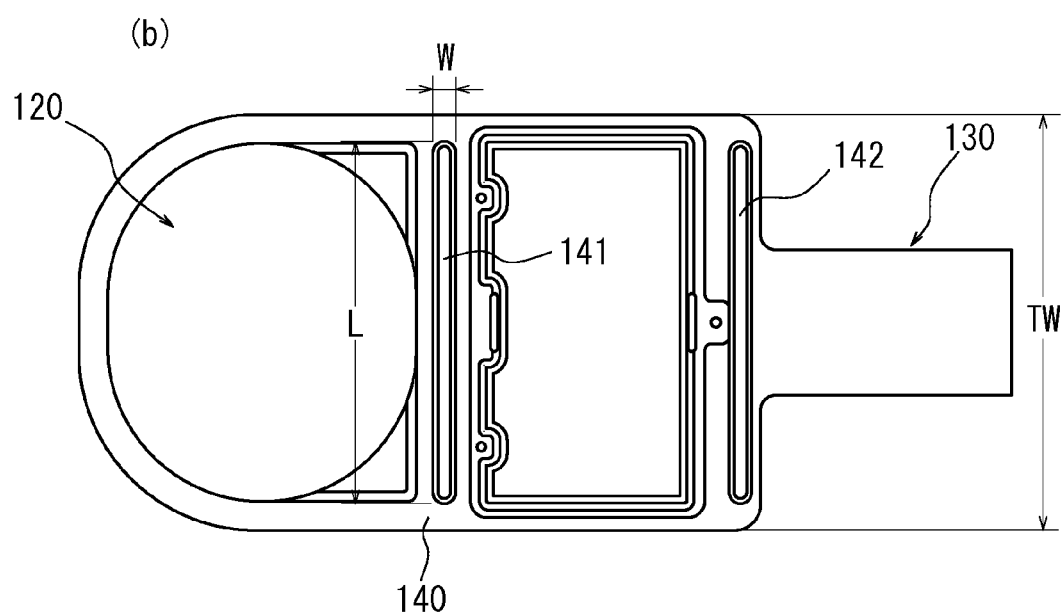

TORQUE ROD AND ENGINE MOUNTING SYSTEM FOR USING SAME

CROSS REFERENCE TO RELATED APPLICATIONS

This application is a National Stage of International Application No. PCT/JP2011/004680, filed on Aug. 23, 2011, which claims priority from Japanese Patent Application Nos. 2010-185725, JP 2010-185728 and JP 2010-185729, filed Aug. 23, 2010 and JP 2010-202281, filed Sep. 9, 2010, the contents of all of which are incorporated herein by reference in their entirety.

TECHNICAL FIELD

The present invention relates to a torque rod formed by a connecting rod connecting two elastic bushes attached respectively to a vibration-generating side and a vibration-receiving side, and an engine mount system using the torque rod. In particular, the present invention proposes a technique effectively preventing the input vibration at the vibration-generating side from being transmitted to the vibration-receiving side.

RELATED ART

In order to achieve both excellent riding comfort and noise vibration performance of a vehicle such as an automobile during driving, various mounting methods, compatible with the characteristics of the vehicle are used to mount an engine alone which is a source of vibration, or a power plant configured by integrating an engine with a transmission and the like (hereinafter referred to as simply "engine") to a vehicle body.

As one of the mounting methods, a pendulum method has been adopted primarily in a small vehicle of the FF type. In this method, the engine is elastically supported like a pendulum by multiple mounts such as two mounts consisting of right and left mounts, and, in order to suppress the displacement of the engine around the roll axis, a torque rod such as one described in Patent Document 1, connects the engine and a member on the vehicle body.

Two contradictory functions are required for the torque rod disposed between the vehicle body side and the engine-side as described above from the viewpoint of improving the riding comfort of the vehicle. That is, it is demanded that the torque rod demonstrate a low rigidity with respect to relatively small vibration caused by the excitation action of the engine itself during idling and normal driving to suppress the input vibration transmitted to the vehicle body while demonstrating a high rigidity with respect to a large input force applied to the engine such as a driving reaction force acting on the engine to reduce the displacement magnitude of the engine.

Under such requirement, Patent Document 2 proposes "a fluid-filled type anti-vibration connecting rod in which an equilibrium chamber formed at the middle portion of the rod body in the longitudinal direction has a wall portion partly formed with a flexible membrane to allow a volume change; an incompressible fluid is filled into the equilibrium chamber; an orifice passage communicatively connecting the equilibrium chamber to the fluid chamber is formed; and at least a part of the orifice passage is formed with using a space inside the rod body". The anti-vibration connecting rod enables a fluid flow between the equilibrium chamber and the fluid chamber formed inside the rubber bush through the orifice passage when a vibration is input, whereby the anti-vibration effect is demonstrated due to the flow action, such as a resonance action of the fluid.

Patent Document 1: Japanese Patent Application Laid-Open Publication No. 2005-188575
Patent Document 2: Japanese Patent No. 4241478

SUMMARY OF THE INVENTION

However, the "anti-vibration connecting rod" described in Patent Document 2 allows the incompressible liquids sealed inside of the equilibrium chamber and the liquid chamber to flow in the orifice passage which communicatively connects the two chambers to attenuate the input vibration by the action of a liquid column resonance and a flow resistance. Therefore, the vibration may not be sufficiently attenuated depending on the magnitudes of the amplitude and the frequency of the input vibration. Especially when the vibration with high frequency vibration is input, the so called clogging of the incompressible liquid occurs in the orifice passage, which hinders sufficient anti-vibration and vibration attenuation effects. Therefore, in some cases, the "anti-vibration connecting rod" may not be suitable to be used as an engine mount which requires the suppression of various input vibration caused by the rotation of the engine or the driving condition of the vehicle.

The present invention is intended to solve these problems of the prior art. The purpose of the invention is to provide a torque rod capable of consistently and effectively demonstrating the desired anti-vibration function in response to various input vibration from the vibration-generating side to more effectively prevent the input vibration from being transmitted to the vibration-receiving side, and an engine mounting system using the same.

A torque rod according to the invention comprises two elastic bushes to be mounted respectively to a vibration-generating side and a vibration-receiving side, and a connecting rod connecting the two elastic bushes, wherein an actively controlled vibration cancellation means for reciprocating a mass member around a shaft extending toward the two elastic bushes is provided in the connecting rod, and the actively controlled vibration cancellation means comprises an actuator including: the shaft having two opposite ends mounted to the connecting rod and extending in an axial direction of the connecting rod; the mass member shaped in a tube to surround the shaft; a coil and a winding core fixed to the shaft in the tube-shaped mass member; a permanent magnet mounted to an inner peripheral surface of the tube-shaped mass member or the shaft; and a connecting member for connecting at least one end of the tube-shaped mass members to the shaft.

It is preferred that the ends of the shaft of the vibration cancellation means are respectively mounted to opposing walls adjacent to the elastic bushes, and at least one end of the shaft is mounted to the connecting rod in a manner that allows a relative displacement in the central axial direction of the shaft with respect to the connecting rod.

In this case, it is preferred that the one end of the shaft of the vibration cancellation means relatively displaceable with respect to the connecting rod, in a posture in which the elastic bushes are respectively mounted to the vibration-generating side and the vibration-receiving side, is disposed at the vibration-generating side. It is also preferred that the one end of the shaft of the vibration cancellation means is disposed to insert into a hole formed on the adjacent wall of the connecting rod.

It is preferred that the other end of the shaft of the vibration cancellation means opposed to the relatively displaceable one end is press-fitted and fixed into the adjacent wall of the vibration-receiving side.

It is preferred that an elastic member such as thin rubber is interposed between the one end of the shaft of the vibration cancellation means and the holes of the connecting rod.

It is preferred that the connecting rod has a gap at least between one of the elastic bushes and one of the ends of the shaft of the vibration cancellation means in the longitudinal direction of the shaft, the gap extending in a direction intersecting the central axial direction of the shaft and having a depth beyond an arranged level of the shaft. It is preferred that two gaps are provided to separate the shaft of the vibration cancellation means from the two elastic bushes respectively in the longitudinal direction of the shaft, and it is preferred that the gap is filled with elastomeric material.

It is preferred that the rod has a rod body having a rectangular cross-section in a plane perpendicular to an axis line connecting the elastic bushes fixed respectively to the vibration-generating side and the vibration-receiving side, and an actuator chamber with an opening at the short side of the rectangular, wherein the actuator is installed through the opening into the actuator chamber and reciprocates the mass member along the shaft paralleled with the axis line to reduce the vibration transmitted to the rod body.

It is preferred that the mass members have a rectangular cross-section in a plane perpendicular to the shaft.

It is preferred that the actuator comprises: the shaft fixed to an inner wall of the actuator chamber, the winding core fixed to the shaft, the coil wound around the winding core, and the permanent magnet disposed on an outer peripheral surface of the winding core, wherein the mass member is adapted to have a higher density of mass at a portion facing to the permanent magnet than a density of mass at the remainder.

It is preferred that one of the elastic bushes has smaller diameter than that of the other elastic bush, and the opening of the actuator chamber is located outward from a tangent line passing through the base of the one elastic bush and touching the opening of the other elastic bush.

It is preferred that one of the elastic bushes has smaller diameter than that of the other elastic bush, the one elastic bush has an opening facing the same direction as the actuator chamber, and the other elastic bush has an opening facing a direction perpendicular to the actuator chamber.

It is preferred that one of the elastic bushes has a smaller diameter than that of the other elastic bush, the one and the other elastic bushes have openings facing a direction perpendicular to the actuator chamber, and the torque rod further comprises a rib disposed at the base of the one elastic bush, and a screw hole for fixing a lid provided in an extension of the rib as viewed from the opening sides of the actuator chamber.

It is preferred that the torque rod is to be mounted to a vehicle so that the opening of the actuator chamber faces a hood.

It is preferred that the rod comprises: elastic bushes mounted respectively to the vibration-generating side and the vibration-receiving side, a connecting rod connecting the elastic bushes, and an actuator installed in an actuator chamber formed inside of the connecting rod and reciprocating the mass members in the axial direction, wherein the actuator chamber has an opening toward an outer surface of the connecting rod, and the opening is located in a region other than a space defined by connecting each of the elastic bushes.

An engine mounting system according to the present invention is for connecting an engine to a vehicle body side by means of any of the above-mentioned torque rods, wherein the two elastic bushes have mutually different spring constants, the elastic bush with smaller spring constant is mounted to an engine-side member, and the elastic bush with larger spring constant is mounted to a vehicle-side member.

According to the torque rod of the present invention, the amplitude and frequency of the vibration of the mass members of the vibration cancellation means are controlled by, for example, the controlling means disposed outside of the torque rod while the mass members are reciprocatively displaced in a phase opposite of that of the vibration input from the vibration-generating side in the axial direction of the torque rod, so that a part of the input vibration which is not absorbed by the elastic bush having a smaller constant of spring can be absorbed to demonstrate an effective vibration controlling characteristics with respect to various input vibrations with different levels of the magnitude of the amplitude and the frequency from the vibration-generating side.

In the torque rod, the linearly movable type actuator described above is employed as the actively controlled vibration cancellation means, so that, when an electric driving force is applied to the linearly movable type actuator, the tube-shaped mass members are reciprocatively displaced in its central axial direction around the shaft having two opposite ends mounted to the connecting rod under a simple control to provide the connecting rod with a cancellation driving force consistently having a stable wave form.

However, in the torque rod above, from the viewpoint of efficient special arrangements, and the demonstration of the effective vibration control characteristics in the axial direction by means of the vibration cancellation means, it is preferred to mount each end of the shaft of the vibration cancellation means to the mutually opposing walls of the connecting rod adjacent to the elastic bushes while disposing the vibration cancellation means between the two elastic bushes in the connecting rod. In this case, once the two ends of the shaft are fixed in the connecting rod, due to the load toward the vibration cancellation means caused by the large tensile load or compressive load in the axial direction of the torque rod during rapid acceleration or deceleration of the vehicle, there are risks such as a lowered vibration response.

On the other hand, when the vibration cancellation means is configured to have a cantilevered support structure with one end of the shaft vibration cancellation means being mounted to one of the opposing walls of the connecting rod while the other end not being mounted to the other side of the opposing walls, the above-mentioned load toward the vibration cancellation means does not occur. However, since the vibration cancellation means is supported at only one end of the shaft by the connecting rod, the reciprocating motion of the mass member in the axial direction of the torque rod may result in a so-called oscillating motion of, for example, the vibration cancellation means in the direction perpendicular to the axial direction of the torque rod, which causes a problem that an appropriate vibration control function by means of vibration cancellation may not be demonstrated.

To address the problem, each end portion of the shaft of vibration cancellation means installed in the connecting rod is mounted to the respective opposing wall, and one end of the shaft is adapted to enable a relatively displace in the central axial direction of the shaft with respect to the connecting rod. Thus, the one end of the shaft may make a relative displacement in the central axial direction of the shaft when a large axial load is applied to the torque rods in the compression or tensile direction during a sudden acceleration or deceleration of the vehicle. This can release the input force applied to the shaft. As a result, the load to the vibration cancellation means having the shaft is reduced to effectively prevent the decreasing of the vibration response of the vibration cancellation means, so that the durability of the torque rod can be improved.

Further, both of the two ends of the shaft of the vibration cancellation means are mounted to the walls of the connecting rod directly or indirectly, so that when the vibration cancellation means is operated, it does not make an oscillating motion, for example, in a direction perpendicular to the central axial of the shaft. Thus, with respect to the input vibration from the vibration generating side in the axial direction of the torque rod, effective vibration controlling characteristics can be constantly demonstrated.

When the one end of the shaft of the vibration cancellation means is disposed to insert into a hole formed on the adjacent walls of the connecting rod, the displacement of the one end of the shaft in the direction perpendicular to the axial direction of the torque rod can be sufficiently restricted in the hole while the one end of the shaft can be slidably displaced in the central axial direction of the shaft in the hole of the connecting rod against the action of the load in the axial direction of the shaft. It is, therefore, possible to sufficiently reduce the load toward the vibration cancellation means and additionally to prevent the above-mentioned oscillating motion of the vibration cancellation means more efficiently.

In a case where an elastic member is interposed between the one end of the shaft of the vibration cancellation means and the inside of the holes of the connecting rod, the elastic member, when a load acts on the shaft, is compressed with a relatively small amount of deformation to be able to suppress the oscillating motion of the vibration cancellation means, and has a relatively large shear deformation in the central axial direction of the shaft to be able to effectively release the load on the shaft.

It should be noted that, if a thin rubber as the elastic member is interposed in the hole, for example, the hole is formed to penetrate the wall adjacent to the elastic bush of the connecting rod in such a manner that the hole reaches the rubber member of the elastic bush at the time of producing the torque rod, and the rubber member of the elastic bush may be disposed to the inside of the hole of the connecting rod as a single piece, so that the production cost may be lower, and the manufacturing process may become easier as compare to a case where a separate member such as a linear bush is attached to the inside of the hole of the connecting rod.

In addition, the torque rod receives a large tensile load or compressive load at the connecting rod connecting the two bushes in its extending direction during sudden acceleration or deceleration of the vehicle due to an inertial force caused by the weight of the engine itself, so that in the torque rod having an actively controlled vibration cancellation means as described above, a large tensile or compressive load is directly applied to the vibration cancellation means, accordingly, which causes problems that the accuracy of the vibration response of the vibration cancellation means is decreased, and that the vibration cancellation means is damaged at an early stage.

In order to address such problem, a method of preventing the load input on the vibration cancellation means by disposing the vibration cancellation means outside of the connecting rod that connects the two bushes, such as the side of the torque rod, may be adopted. In this method, however, the volume of the torque rod itself is larger than that in the case where the vibration cancellation means is disposed on the connecting rod that connects the two bushes, which may affect the space saving. Also, under this circumstance, installing the vibration cancellation means outside of the connecting rod increases the moment of inertia of the torque rod and decreases the resonant frequency of the pitching vibration, so that there is a problem that a vibration with larger amplitude occurs easily due to a resonance with the vibration of the engine, and thus the sound vibration performance of the torque rod is deteriorated.

When the vibration cancellation means is disposed inside of the connecting rod that connects the two elastic bushes, it is possible to save the space and to effectively reduce the vibration in the extending direction of the connecting rod that connects the two elastic bushes. In addition, when the connecting rod has a gap portion at least between one of the elastic bushes and one of the ends of the shaft of the vibration cancellation means in the longitudinal direction of the shaft, the gap portion is deformed upon receiving the tensile or compressive load on the torque rod in the extending direction of the shaft to absorb the load, so that the input force on the vibration cancellation means including the shaft is suppressed sufficiently to effectively prevent the deterioration of the operating performance of the vibration cancellation means and largely improve the durability of the vibration cancellation means.

It should be noted that when the reciprocation of the mass member of the vibration cancellation means on the rod is performed by the action of the electromagnetic induction between the coil and the winding core and the permanent magnet mounted on the inner peripheral surface of the mass member or on the shaft, the vibration of the mass members can be easily controlled by, for example, connecting the coil and the winding core to an appropriate controlling means with a lead wire or the like. Furthermore, by adjusting the spring constants of the connecting members to be used and the weight of the mass members, the eigenfrequency of the vibration of the mass members may be changed to, thereby, obtaining the controlling force of the vibration of the desired frequency.

Meanwhile, in this type of torque rod, when an actuator chamber having an opening is provided on the connecting rod or the like to install the actuator, the opening of the torque rod may deform largely where excessive external force is applied depending on the position of the opening of the actuator chamber.

In this regard, a rod body may be provided with an actuator chamber having a rectangular cross-section in a plane perpendicular to an axis line connecting the two elastic bushes and an opening at the short side of the rectangular, and the actuator is installed through the opening into the actuator chamber. This makes it possible that the actuator chamber of the rod body has the opening at the short side of the rectangular cross-section in a plane perpendicular to an axis line connecting the elastic bushes fixed respectively to the vibration-generating side and the vibration-receiving side, so that, even if a very large tensile force is applied to the rod body, the deformation of the opening can be prevented.

In addition, according to the engine mount system of this invention, the placement posture of the torque rod provided with the actively controlled vibration cancellation means between the engine-side member and the vehicle-side member is such that an elastic bush with smaller spring constant of two different elastic bush is mounted to an engine-side member, and an elastic bush with larger spring constant is mounted to a vehicle-side member. Thus, when the vibration is input from the engine-side in the axial direction of the torque rod, the elastic bush with smaller spring constant mounted to the engine-side can absorb most of the input vibration to effectively prevent the transmitting of the vibration from the engine-side to the vehicle-side without the necessity of enhancing the capability of the vibration cancellation means so much.

In the engine mount system of the present invention, the torque rod having the lightest weight among the engine-side member, the torque rod and the vehicle-side member, which are a transmitting path of the vibration from the engine-side, is provided with the above-mentioned vibration cancellation means, so that the energy efficiency can be improved as compared with the case where the vibration cancellation means is installed on the engine-side member or the vehicle-side member.

In other words, when the vibration cancellation means is installed on the vehicle-side member or on the engine-side member with the inertia force greater than that of the torque rod to cancel the vibration input from the engine-side, the vibration cancellation means needs a larger driving force for canceling the vibration force of the input vibration depending heavily on the mass rather than the acceleration, and thus the vibration cancellation means needs a significant energy for cancelling the input vibration from the engine side in the engine-side member or the vehicle-side member, resulting a decreased energy efficiency.

BRIEF DESCRIPTION OF DRAWINGS

FIG. 21 illustrates a seventh embodiment of the torque rod.

FIG. 29 illustrates the lid to be used in the eleventh embodiment of the torque rod.

FIG. 31 illustrates the lid to be used in the twelfth embodiment of the torque rod.

FIG. 32 is a plan view showing an embodiment of the torque rod.

Embodiments of a torque rod of the present invention are described below with reference to the figures. In FIG. 1, the reference numeral 1 denotes a torque rod connecting an engine-side and a vehicle-side.

Figure 1:
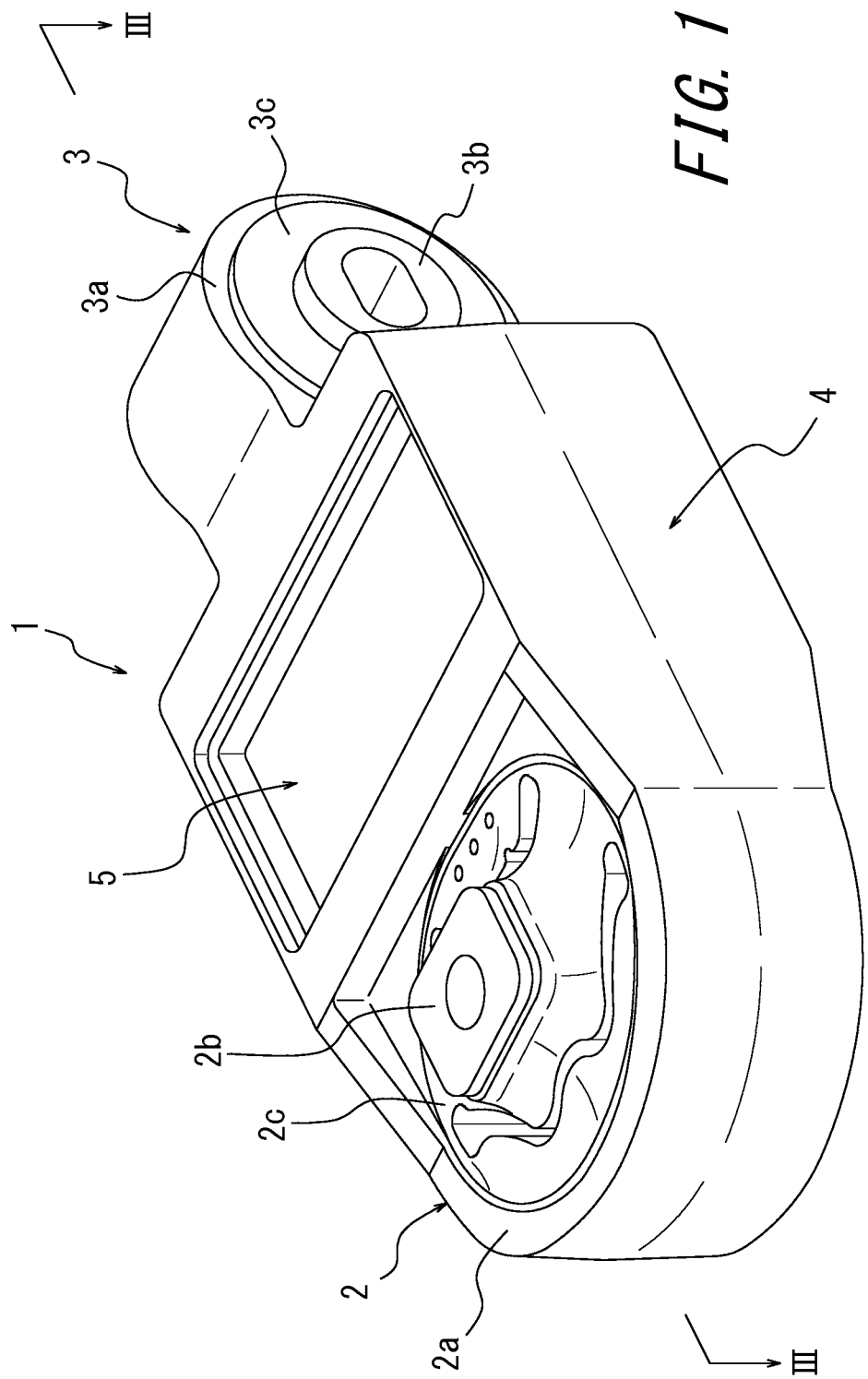
FIG. 1 is a perspective view showing a first embodiment of the torque rod of the present invention.

A torque rod 1 includes two elastic bushes 2,3 with mutually different spring constants, a connecting rod 4 connecting the two elastic bushes 2,3, and an actively controlled vibration cancellation means 5 provided in the connecting rod 4.

The elastic bush 2, 3 consists of an outer tube 2a, 3a made of a rigid material such as a metal material, an inner tube 2b, 3b also made of a rigid material arranged, for example, concentrically inside of the outer tube 2a, 3a, and a rubber material 2c, 3c connecting the inner peripheral surface of the outer tube 2a, 3a and the outer peripheral surface of the inner tube 2b, 3b. As illustrated, the elastic bush 2 is adapted to have the diameter of the outer tube, more specifically the volume of the rubber member disposed between the inner tube and the outer tube larger than those of the elastic bush 3 to reduce the spring constant. Hereinafter, the elastic bush 2 with a smaller spring constant is referred to as the "large-diameter elastic bush 2", and the elastic bush 3 with a larger spring constant is referred to as the "small-diameter elastic bush 3".

Figure 2:
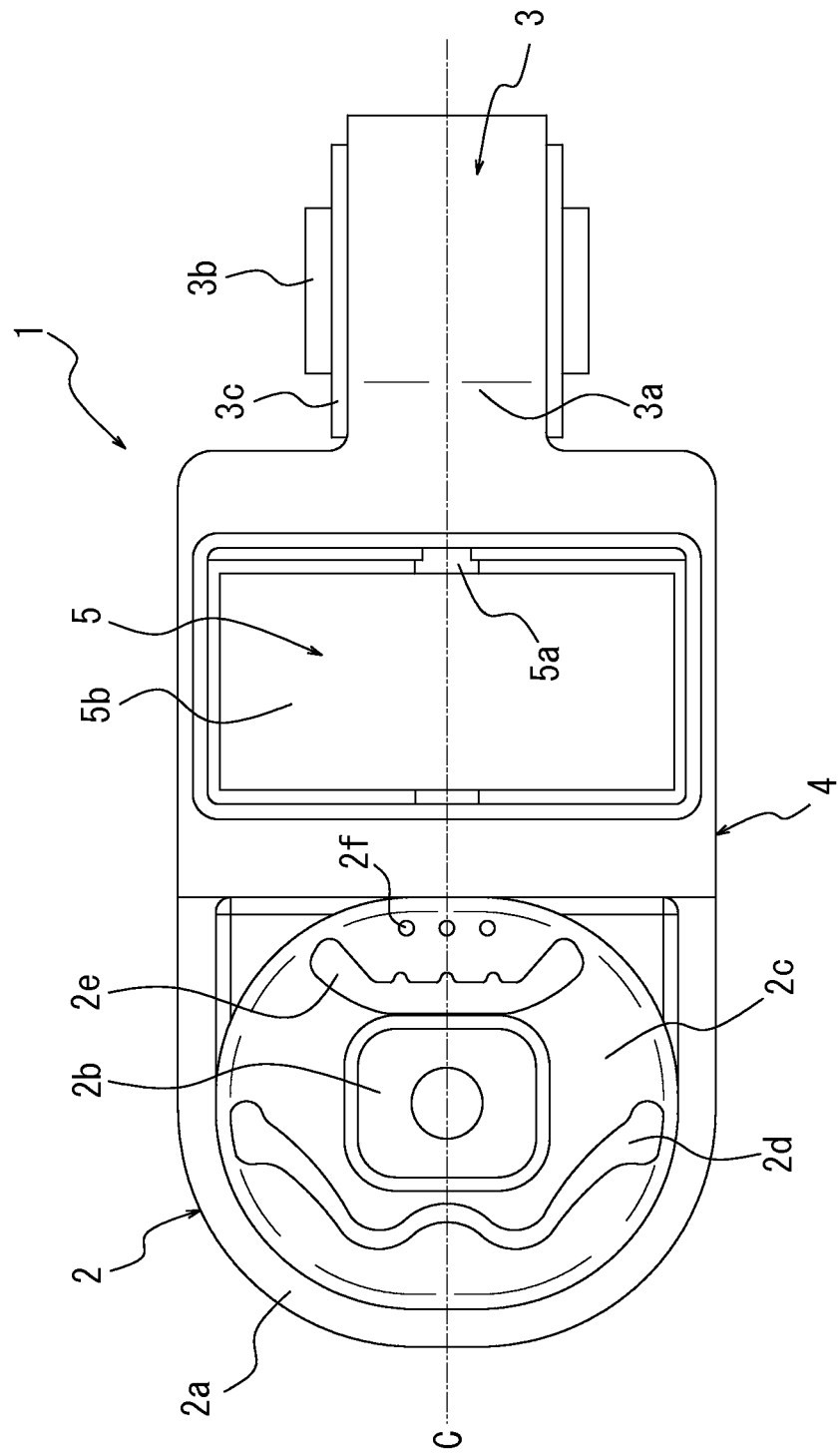
FIG. 2 is a plan view of the torque rod in FIG. 1.

It is noted that, in the illustrated embodiment, in order to further reduce the spring constant with respect to the input of the large-diameter elastic bush 2 of the torque rod 1 in the central axial direction, a cavity 2d having an M-shape in a plane view and a cavity 2e having a substantially arcuate shape in a plane view are provided on the rubber member 2c of the large-diameter elastic bush 2 such that, as illustrated in FIG. 2 as a plane view, they are spaced across the inner tube 2b in the central axial direction of the torque rod 1 and penetrate the elastic bush 2 in the thickness direction. Further, three cavities 2f having a circular contour are provided between the outer tube 2a and the substantially arcuate-shaped cavity 2e to penetrate the rubber bush in the same manner.

The illustrated torque rod 1 constitutes an engine mounting system by mounting the large-diameter elastic bush 2 to the engine-side member (not shown), and mounting the small-diameter elastic bush 3 to the vehicle-side member (not shown). This allows the large-diameter elastic bush 2 with small spring constant mounted at the engine-side to absorb most part of the input vibration from the engine-side, so that the vibration input from the engine-side can be effectively cancelled with respect to the vehicle-side member without greatly increasing the vibration absorption capacity required to the actively controlled vibration cancellation means 5 in the connecting torque rod 4.

The actively controlled vibration cancellation means 5 provided in the connecting rod reciprocates the mass member 5b in the axial direction C of the connecting rod 4 around the arrangement direction of the two different sized elastic bushes 2, 3, or, in the illustrated embodiment, a shaft 5a extending along and arranged on an axial direction C of the connecting rod. According to the vibration cancellation means 5, the torque rod 1 is disposed between the vehicle-side and the engine-side, and, upon receiving the vibration from the engine side to the torque rod 1, the mass member 5b of the vibration cancellation means 5 is reciprocated in a reverse phase of the input vibration from the engine-side by, for example, using an external control means outside of the torque rod 1, thereby effectively cancelling the input vibration.

Therefore, the vibration cancellation means 5 is preferably a linearly movable type actuator. For example, as illustrated in a cross-section view in FIG. 3, each end of the shaft 5a with a solid circular cross-section is respectively mounted to the opposing walls of the rectangular-shaped recess 4a provided on the connecting rod 4 of the torque rod 1 in the axial direction C, and the tube-shaped mass member 5b having a cuboid-shaped outer contour is disposed to surround the shaft 5a. The end of the mass member 5b at, in the figure, the large-diameter elastic bush 2 side is connected and fixed to the shaft 5a by a thin-plate-shaped connecting member 5c such as a flat spring, over the entire periphery. In addition, two pairs of permanent magnets 5d adjacent to one another are attached on the inner peripheral surface of the tube-shaped mass member 5b such that the pairs of permanent magnets are oppositely spaced from the shaft 5a with their polarities reversely oriented to each other. On the other hand, a coil 5e and a winding core 5f are disposed at predetermined intervals from the permanent magnet 5d on the shaft 5a, and one end of the lead wire 5g for supplying the electricity power from the controlling means (not shown) outside of the torque rod 1 is connected to the coil 5e. It is noted that if the linearly movable type actuator 5 is disposed on the torque rod 1 to be subjected to use, the cuboid-shaped recess 4a of the connecting rod 4 is preferably covered with a lid member (not shown).

The linearly movable type actuator 5 thus configured is supplied the electricity power through the lead wire 5g from the vibration cancellation means provided outside of the torque rod to generate a magnetic field in the winding core 5f, so that the winding core 5f functions as an electromagnet, and, in response to the direction of the power supplied to the coil, a magnetic force is applied to the permanent magnets 5d at the inner peripheral surface of the mass member 5b.

Figure 3:
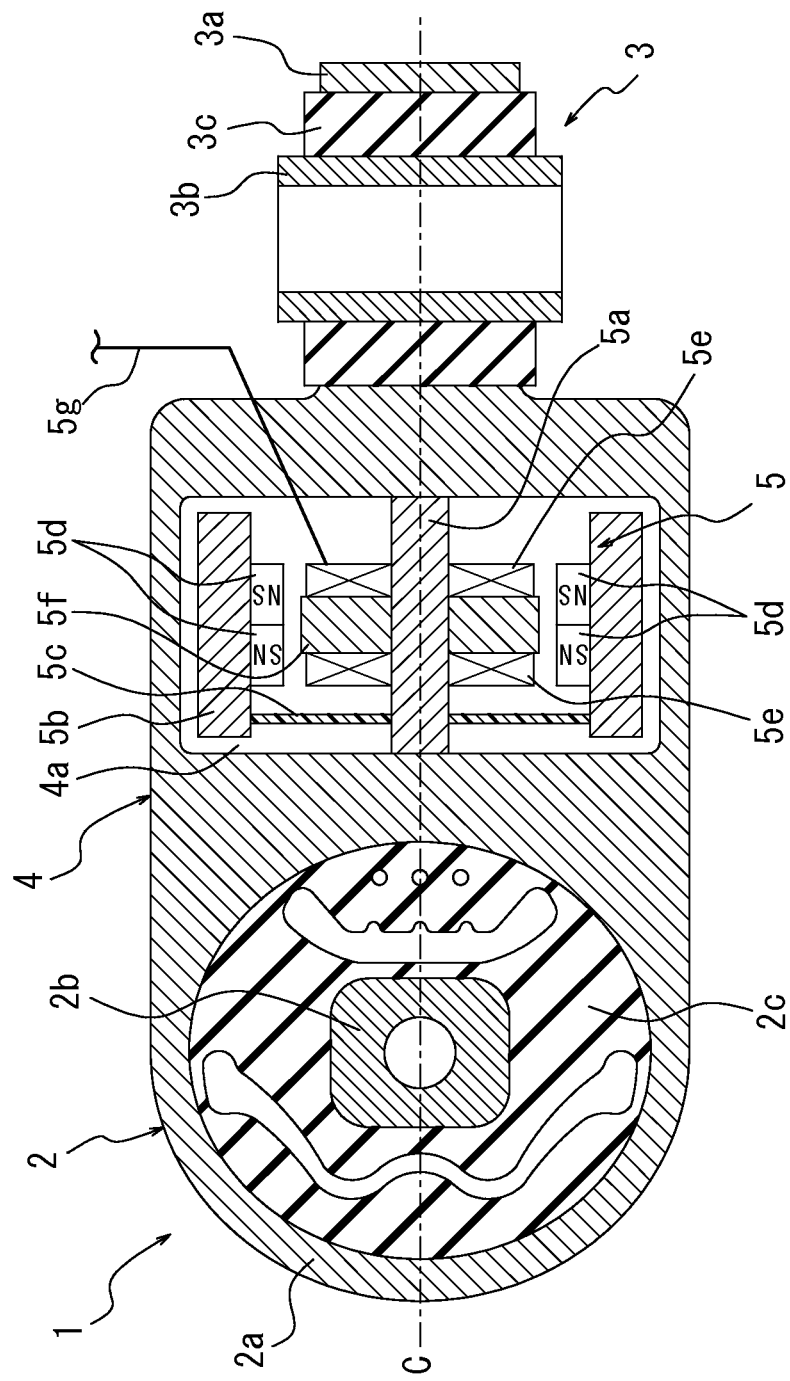
FIG. 3 is a cross-section view taken along the line III-III of the torque rod in FIG. 1.
Figure 4:
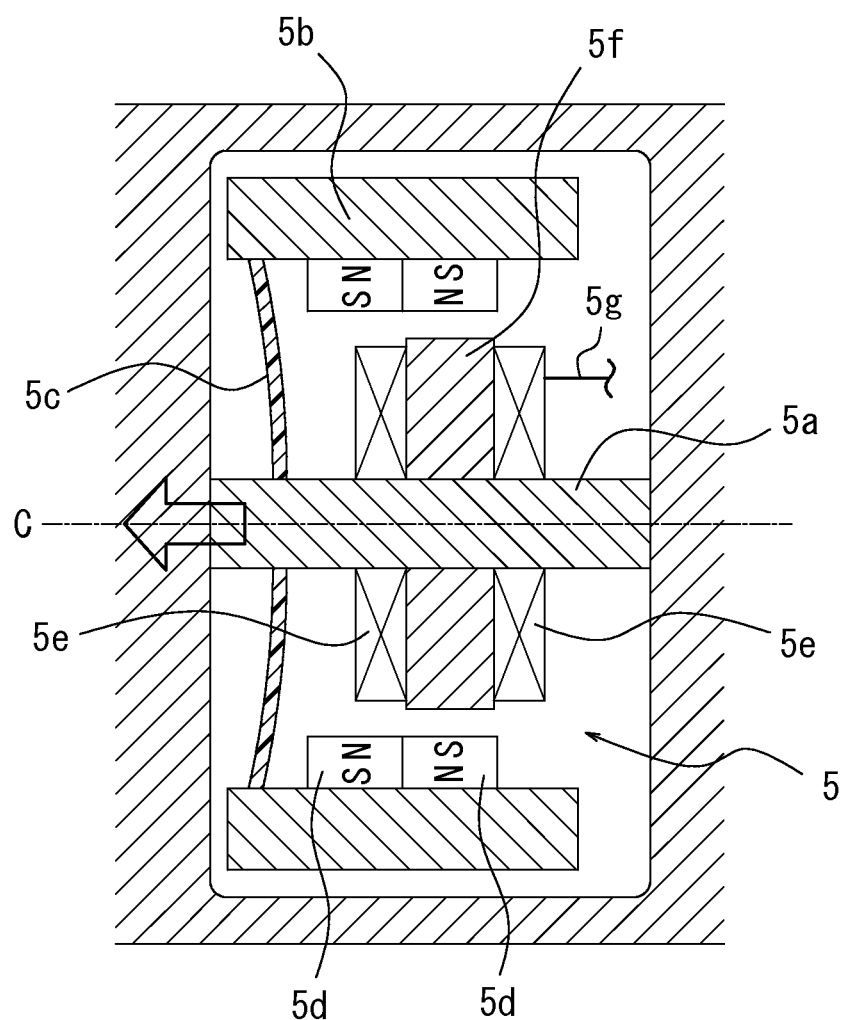
FIG. 4 is a diagram illustrating the operation of the torque rod in FIG. 1 when the power is applied to the coil.

Due to the direction of the power supplied to the coil 5e, the repulsing force is generated between the same polarities or the attracting force is generated between the opposite polarities to make a relative displacement of the mass member 5b with respect to the shaft 5a in the central axial direction of the shaft 5a, for example, at the large diameter elastic bush 2 side, as shown exaggeratedly in the enlarged cross section view in FIG. 4. Then, the restoring force due to the elastic deformation of the connecting member 5c connecting the shaft 5a and the mass member 5b is generated to apply a force shown as an arrow in the figure to the torque rod 1. On the other hand, a force opposite to the direction of the arrow illustrated in the figure is applied to the mass member 5b, and the mass member 5b returns to the originally arranged position as illustrated in FIG. 3. It is noted that, in order to relatively displace the mass member 5b at the small-diameter elastic bush 3 side, the direction of the power supplied to the coil 5e is reversed to the direction of the electricity power for relatively displacing the mass member 5b at the large-diameter elastic bush 2 side.

Therefore, by supplying the alternating current or the pulsating current to the coil 5e, or by properly shutting down the power supplied to the coil 5e, a desired vibration can be generated on the torque rod 1 by the relative displacement of the mass member 5b with respect to the shaft 5a. Thus, the linearly movable type actuator 5, on the torque rod 1 generates the vibration having a phase opposite to that of the input vibration from the engine-side to be able to effectively cancel the input vibration from the engine-side by the action of the superposition of vibration.

Figure 5:
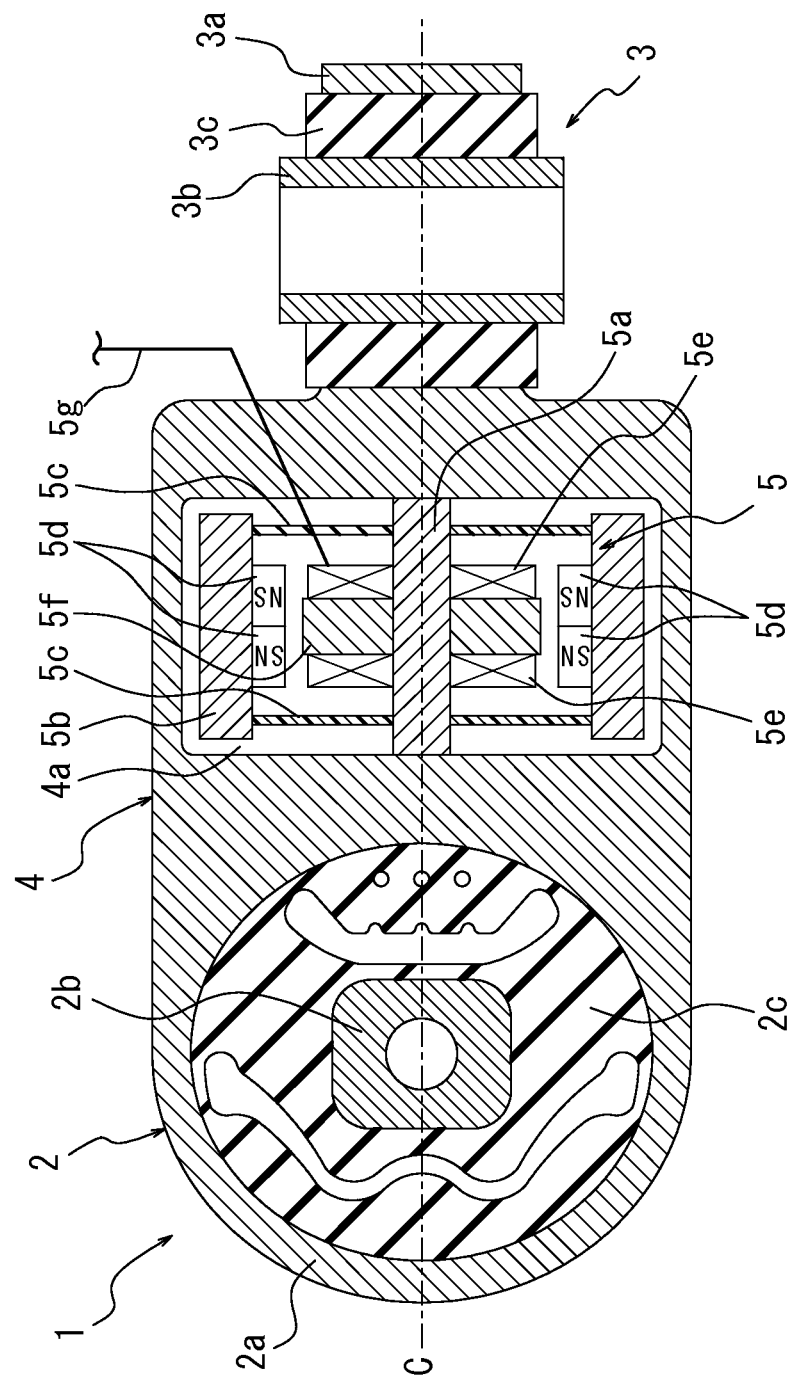
FIG. 5 is a cross-section view of a modification of the vibration cancellation device provided in the connecting rod similar to FIG. 3.

In FIGS. 3 and 4, the connecting member 5c connecting the shaft 5a and the tube-shaped mass member 5b is provided only at the end of the large-diameter elastic bush 2 side of the mass member 5b, However, the connecting member 5c, as illustrated in FIG. 5, may be provided at both ends of the mass member 5b to connect the both ends of the mass member 5b to the shaft 5a. In this case, the relative displacement in the central axial direction of the shaft 5a of the mass member 5b caused by the power supplied to the coil 5e may be more stabilized. In addition, although not illustrated in the figure, both of the permanent magnet and the winding core as an electromagnet may be mounted to the shaft.

It should be noted that on the controlling means disposed outside of the torque rod 1 may use the reference signals having the amplitude component and the frequency component corresponding to the vibration to be absorbed by the cancellation means 5 to control the supplying current toward the coil 5e to effectively apply the vibration force of the amplitude or the frequency corresponding to the vibration to be absorbed. As the reference signal, for example, the inspected value of the input vibration from the engine-side on the torque rod 1 may be used.

When the torque rod provided with the vibration cancellation means is used as an engine mounting system, the elastic bush with smaller spring constant may generate resonance with larger movements in the directions other than the directions that the vibration to be absorbed by the vibration cancellation means within the muffled sound area 500 Hz to 200 Hz. For the purpose of controlling the resonance, in the torque rod 1 of the present invention, as illustrated in the perspective view of the second embodiment in FIG. 6, there may be provided a dynamic damper 6 for controlling the vibration in the directions other than the direction that the vibration to be absorbed by the actively controlled vibration cancelation means 5 consisting of, for example, an elastic member 6a and a spindle 6b mounted at the outer peripheral surface of the outer tube 2a of the large-diameter elastic bush 2 in the axial direction of the connecting rod 4.

Figure 6:
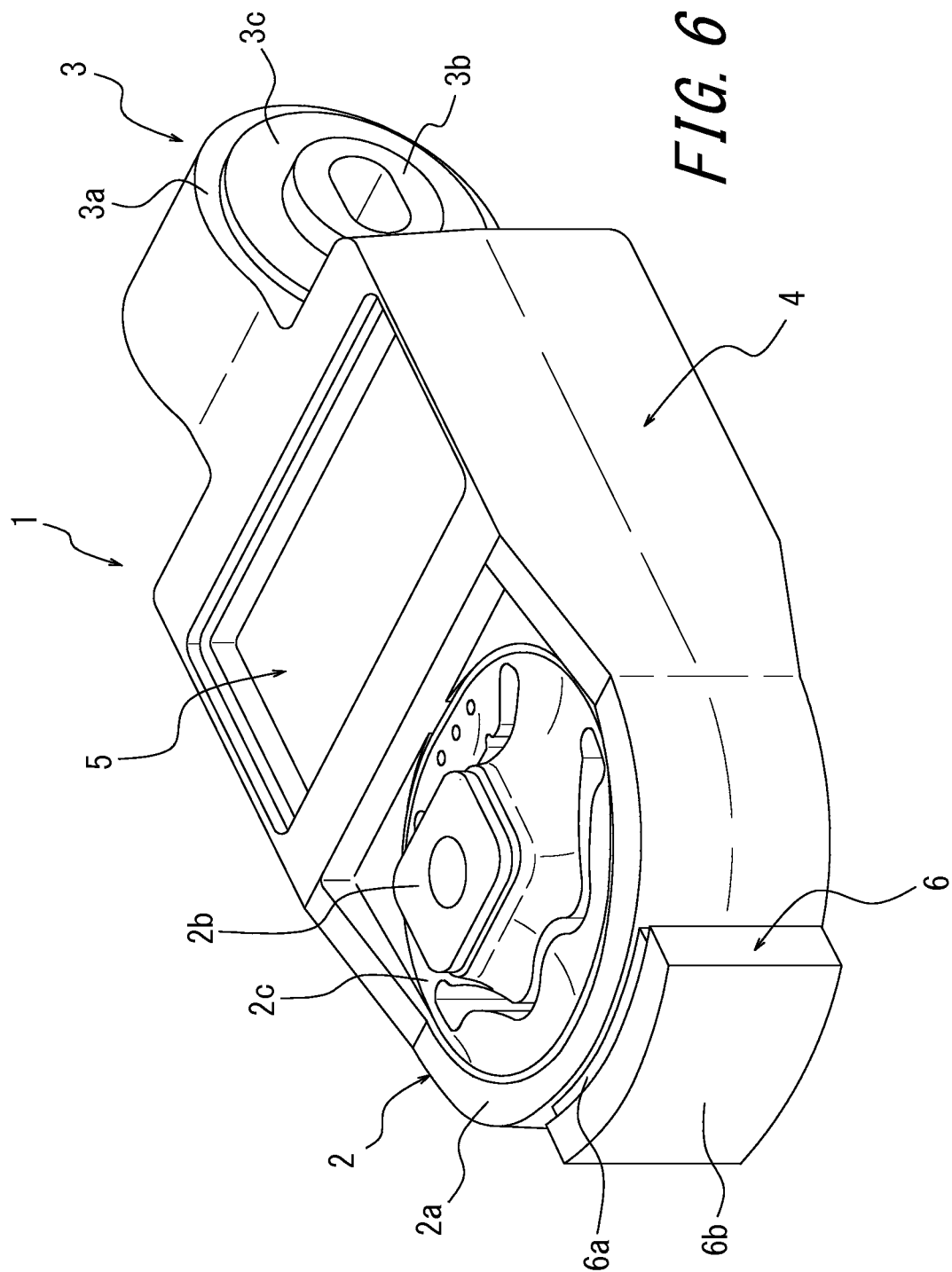
FIG. 6 is a perspective view showing a second embodiment of the torque rod.

According to the dynamic damper 6, by tuning the resonance frequency and the magnitude of the spindle 6b of the dynamic damper 6, the vibration level of the significant movements from the resonance of the large-diameter elastic bush 2 which may occur on the torque rod 1 illustrated in FIG. 6 may be reduced. In this case, particularly, the dynamic damper 6 is formed with the elastic member 6a and the spindle 6b which are installed at the outer peripheral surface of the outer tube of the large-diameter elastic bush 2 in the axial direction of the connecting rod 4, so that a shear deformation of the elastic member 6a interposed between the outer tube 2a of the large-diameter elastic bush 2 and the spindle 6b generates the resonance of the dynamic damper 6, and the distance from the elastic main axis of the resonance to the dynamic damper 6 becomes far enough to increase the inertia moment. Therefore, it is possible that while the dynamic damper 6 has a simple structure, the vibration in the directions other than the direction of the vibration to be absorbed by the vibration cancellation means 5 can be sufficiently reduced.

Figure 7:
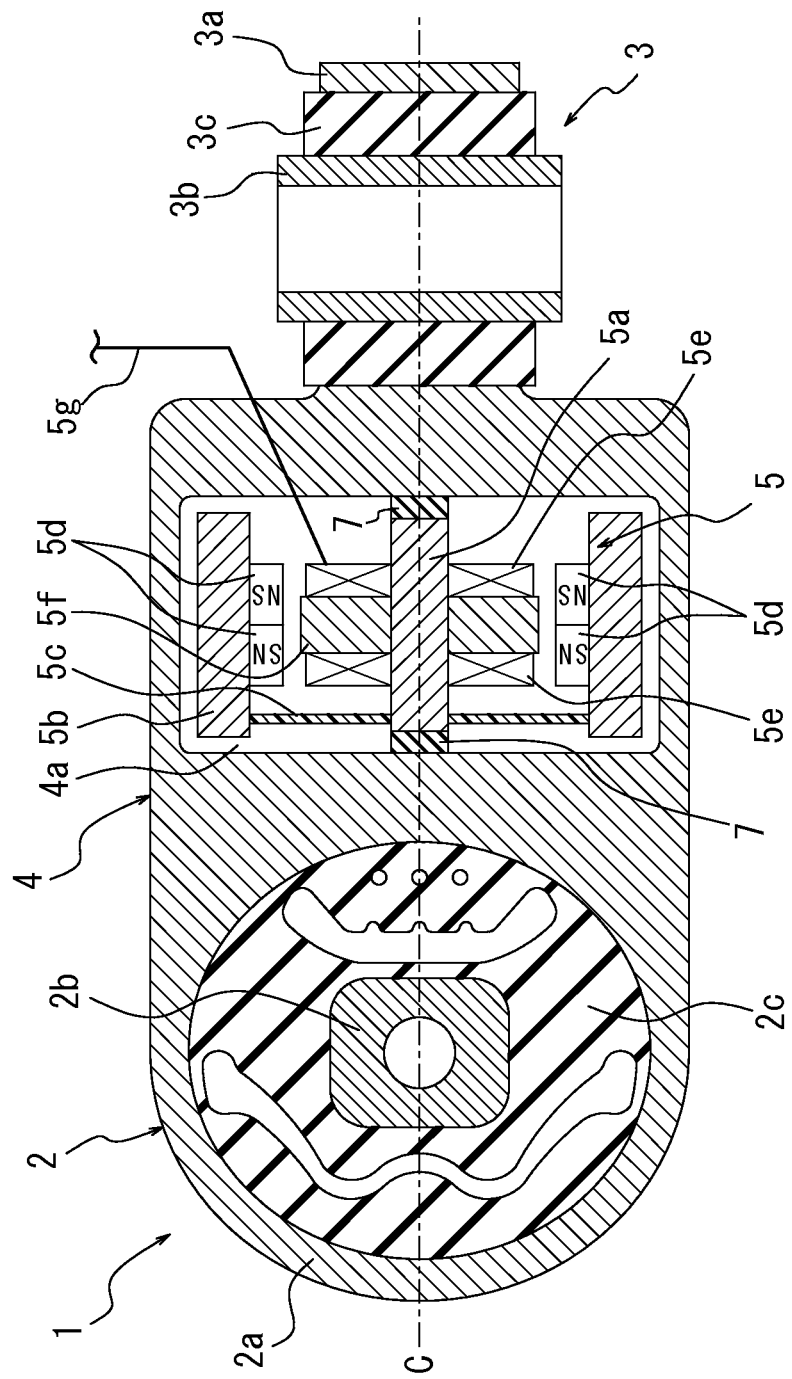
FIG. 7 is a cross-section view of a third embodiment of the torque rod similar to FIG. 3.

In addition, as a third embodiment illustrated in FIG. 7, an elastic body 7 may be interposed at the connecting portions connecting the actively controlled vibration cancellation means 5 in the connecting rod 4 of the torque rod 1 the connecting rod 4, in the illustrated embodiment, at the connecting portions connecting the shaft 5a and the wall surface of the recess of the connecting rod 4. In this case, due to the shear deformation of the elastic body 7, the vibration cancellation means 5 itself functions as a dynamic damper, thereby controlling the vibration in the directions other than the direction of the vibration to be absorbed by the actively controlled vibration cancellation means. In this case, as compared to the second embodiment provided with the distinct dynamic damper 6, the weight increase of the torque rod may be suppressed.

Figure 8:
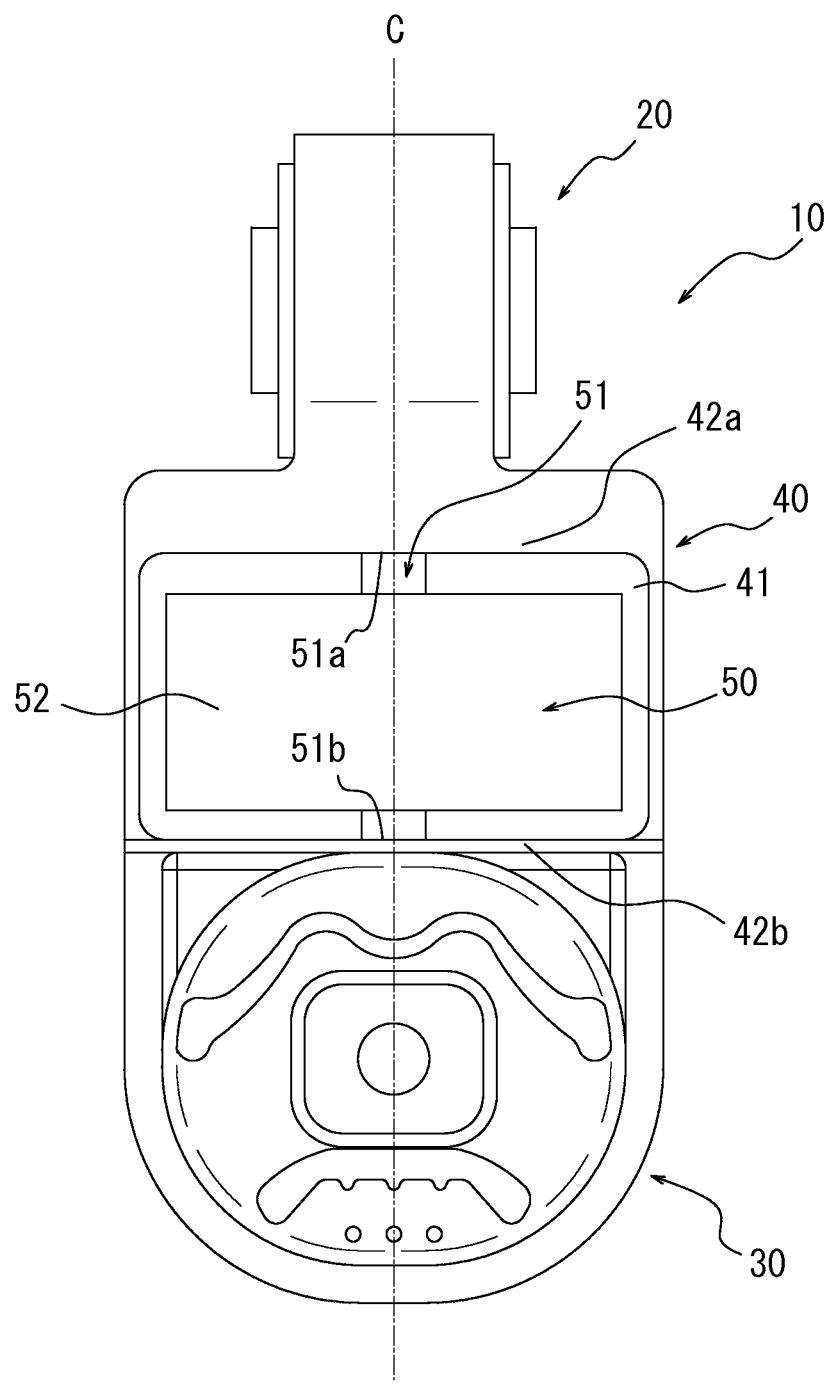
FIG. 8 is a plan view showing a fourth embodiment of the torque rod.

Next, a fourth embodiment of the torque rod of the present invention is discussed. The torque rod 10 illustrated in FIG. 8 includes two types of elastic bushes 20,30 with mutually different outer diameter sizes, a connecting rod 40 connecting the two elastic bushes 20,30, and an actively controlled vibration cancellation means 50 arranged between the two elastic bushes 20,30 in the connecting rod 40.

The vibration cancellation means 50 is for reciprocating a mass member 52 around a shaft 51 extending toward the two elastic bushes 20, 30. In order to dispose the vibration cancellation means 50 on the connecting rod 40, as illustrated in the figure, each end 51a, 51b of the shaft 51 is respectively mounted to, for example, opposing sidewalls 42a,42b of a cuboid-shaped recess 41 formed on the connecting rod 40 adjacent to the elastic bushes 20,30.

Figure 9:
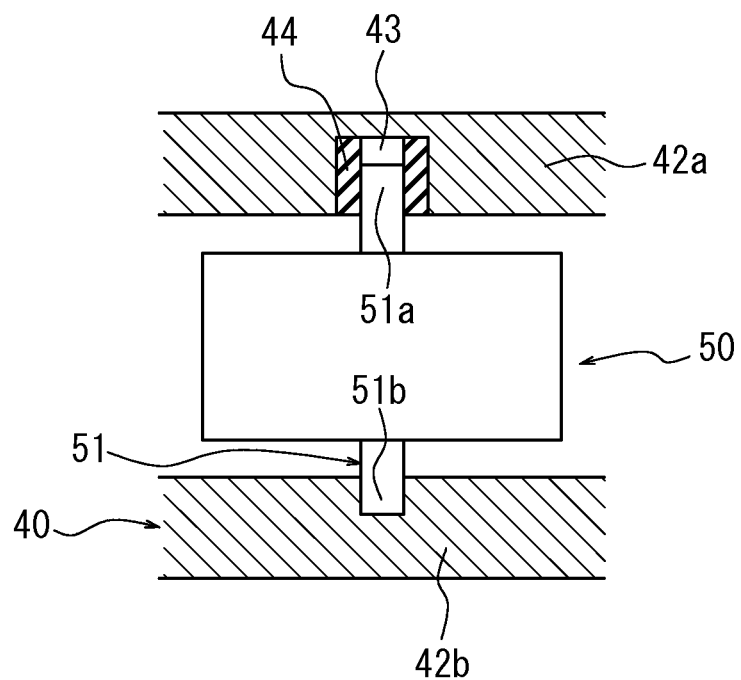
FIG. 9 is a cross-section view schematically showing a mounting posture of the vibration cancellation means of the torque rod shown in FIG. 8 to the connecting rod.

The installation on the shaft 51 is such that, as illustrated in the enlarged cross-section view in FIG. 9, the one end 51a of the shaft 51 of the vibration cancellation means 50 is inserted into the hole 43 formed on the adjacent sidewall 42a of the connecting rod 40, and a thin rubber 44 is interposed between the inner surface of a hole 43 and the one end 51a of the shaft 51. As a result, when a tensile or compression load in the axial direction is applied onto the torque rod 10, primarily due to the shear deformation in the vertical direction of the thin rubber 44 as illustrated in the figure, the shaft 51 makes a relative displacement in the central axial direction of the shaft 51 with respect to the connecting rod 40 to sufficiently reduce the input on the vibration cancellation means 50.

In addition, the elastic member interposed between the inner surface of the hole 43 and the one end 51a of the shaft 51 is formed as a thin rubber 44, and the one end 51a of the shaft 51 may be relatively displaced with respect to the connecting rod 40, so that the vibration in the central axial direction of the shaft 51 itself in the connecting rod 40 or the pitching vibration on the entire connecting rod 40 caused by the deformation of the connecting rod 40 can be effectively reduced by the shear deformation of the thin rubber 44.

Figure 10:
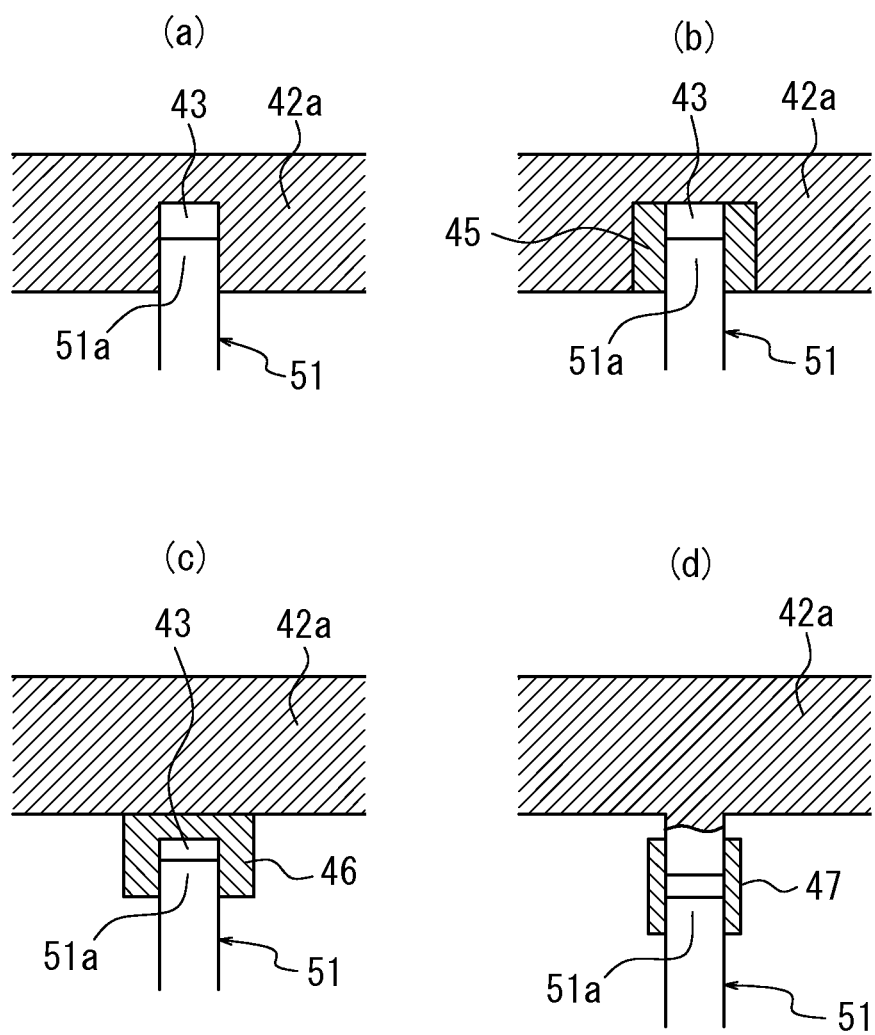
FIG. 10 is an enlarged cross-section view showing a modified example of the mounting posture of one end of the connecting rod

In regards to the installation of the shaft 51 on the connecting rod 40, as far as the one end 51a of the shaft 51 can make a relative displacement in the central axial direction of the shaft 51 with respect to the connecting rod 40, there may be various possible ways of installation such as illustrated in the enlarged views of the installation portions between the one end 51a of the shaft 51 and the sidewall 42a in FIG. 10.

In the embodiment illustrated in FIG. 10a, the shaft 51 is directly slid and inserted into the inner surface of the hole 43 without interposing the thin rubber 44 at the inner surface of the hole 43 of the sidewall 42a. When a load is applied, the shaft 51 is slidably displaced in the hole 43 to release the force. In addition, in the embodiment illustrated in FIG. 10b, although details are not illustrated, a linear bush 45 filled with a plurality of balls inside is installed at the inner surface of the hole 43 of the sidewall 42a, and the shaft 51 is inserted and disposed through the linear bush 45.

In addition, the mounting structure illustrated in FIG. 10c forms the hole 43 on a distinct member 46 installed on the sidewall 42a, and the one end 51a of the shaft 51 is inserted and placed in the hole 43. In addition, in the embodiment illustrated in FIG. 10d, a tube-shaped member 47 covers and connects both of a projection formed on the sidewall 42a and the one end 51a of the shaft 51 to allow a relative displacement of the one end 51a of the shaft 51.

Figure 11:
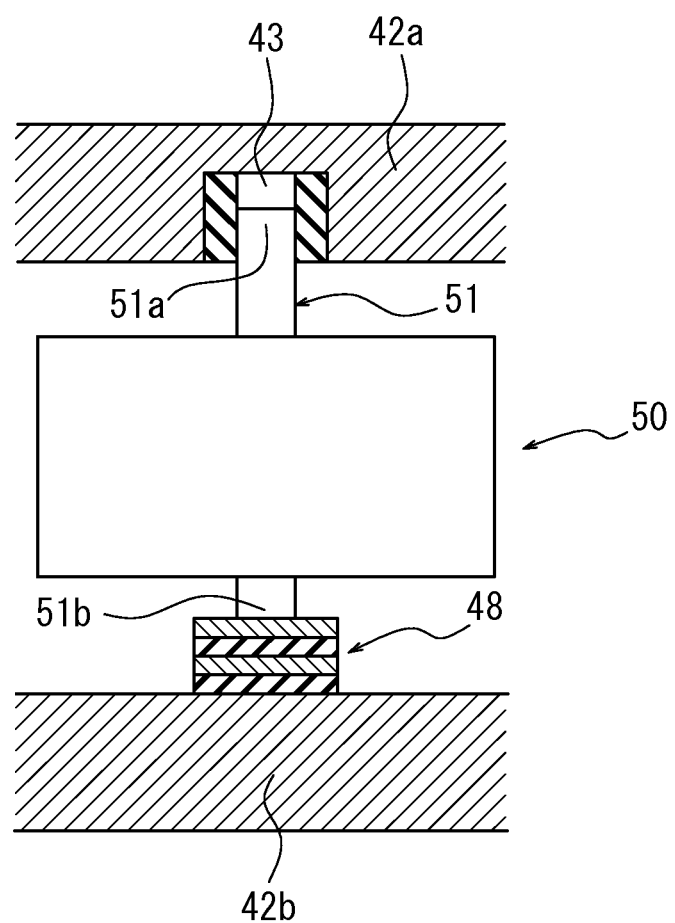
FIG. 11 illustrates a modified example of the mounting posture of the other end of the connecting rod shown in a similar manner as FIG. 9.

On the other hand, from the viewpoint of the effectively canceling the input vibration in the axial C direction of the torque rod 10 by means of the vibration cancellation means 50, the other end 51b of the shaft 51 may be firmly fixed to the sidewall 42b opposing the sidewall 42a of the connecting rod 40. Alternatively, as illustrated in FIG. 11, the other end 51b of the shaft 51 may be mounted to the sidewall 42b through a multilayered elastic body 48 formed by laminating a rigid member and a multilayered rubber member.

Figure 12:
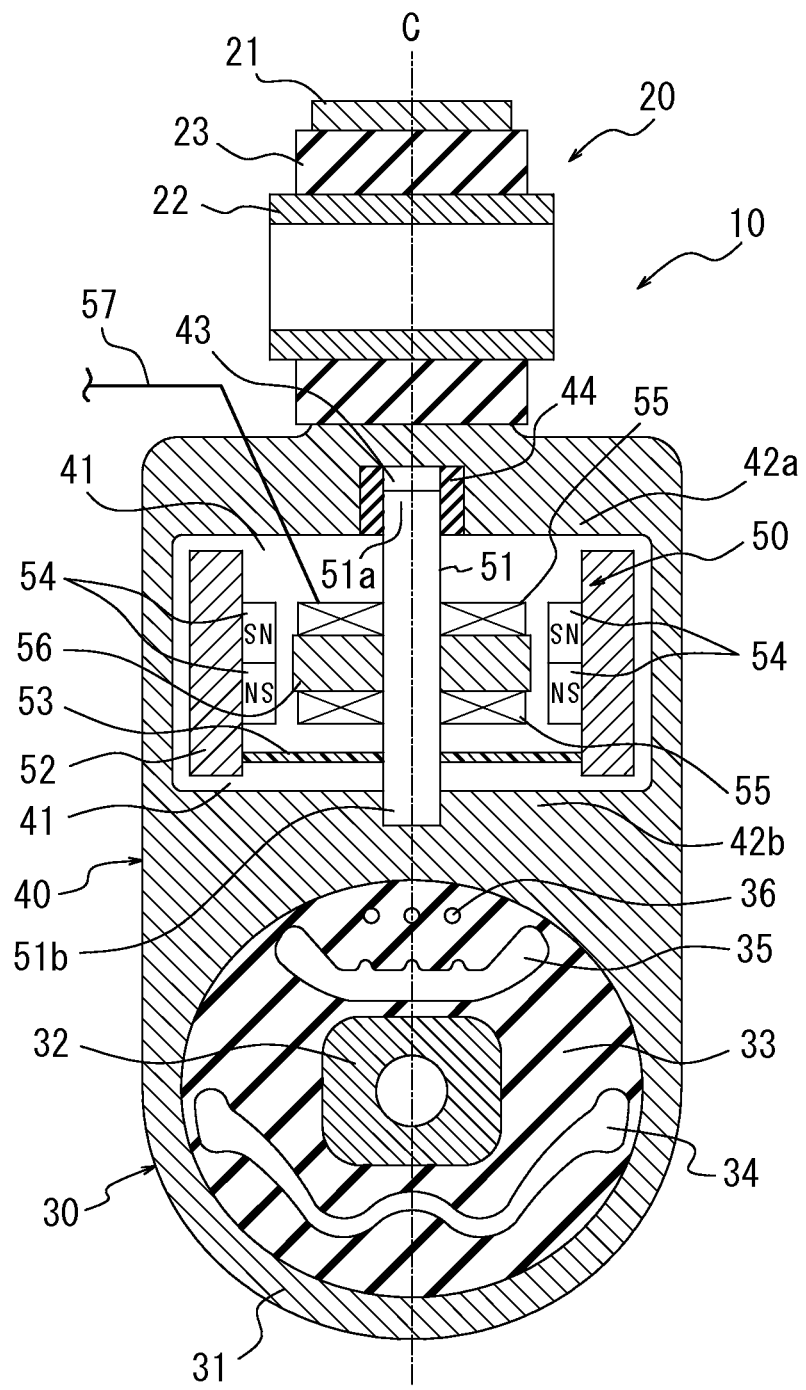
FIG. 12 is a vertical sectional view including the central axial line of the torque rod shown in FIG. 8.

The vibration cancellation means 50, for example, may be formed as a linearly movable type actuator as illustrated in the vertical cross-section view illustrated in FIG. 12. In other words, for example, the tube-shaped mass member 52 in rectangular-parallelepiped-shape formed by square-tube-shape is disposed on the actuator 50 to surround the shaft 51 as illustrated in FIG. 12, and the end of the mass member 52 at the elastic bush 30 side is fixed and connected to the shaft 51 over the entire periphery by a thin-plate-shaped connecting member 53 such as a flat-spring. In addition, two pairs of permanent magnets 54 adjacent to one another are attached on the inner peripheral surface of the tube-shaped mass member 52 such that the pairs of permanent magnets are oppositely spaced from the shaft 51 with their polarities reversely oriented to each other. On the other hand, a coil 55 and a winding core 56 are disposed at predetermined intervals from the permanent magnet 54 on the shaft 51 and one end of the lead wire 57 for supplying the electricity power from the controlling means outside of the torque rod 10 (not shown) is connected to the coil 55. It should be noted that the linearly movable type actuator 50 is disposed on the torque rod 10 to be subjected to use, a lid member (not shown) is preferred to cover the cuboid-shaped recess 41 of the connecting rod 40.

In addition, the elastic bushes 20, 30 consists of an outer tube 21, 31 made of rigid material such as metal, an inner tube 22, 32 made of rigid material and disposed, for example, in concentric with the outer tube, and a rubber member 23, 33 connecting an inner peripheral surface of the outer tube 21, 31 and an outer peripheral surface of the inner tube 22, 32. In this case, the elastic bushes 20, 30 as illustrated in the figure have the outer tubes 21, 31 and the inner tubes 22, 32 with different diameter sizes. However, they may have same diameter sizes.

It should be noted that a cavity 34 having an M-shape in a plane view and a cavity 35 having substantially arcuate shape in a plane view are disposed on the rubber member 33 of the large-diameter elastic bush 30 such that, as illustrated in FIG. 12, they are spaced across the inner tube 32 in the central axial direction of the torque rod 10 and penetrate the elastic bush 30 in the thickness direction. Further, three cavities 36 having circular contour are provided between the outer tube 31 and the substantially arcuate-shaped cavity 35 to penetrate the rubber bush in the same manner.

Figure 13:
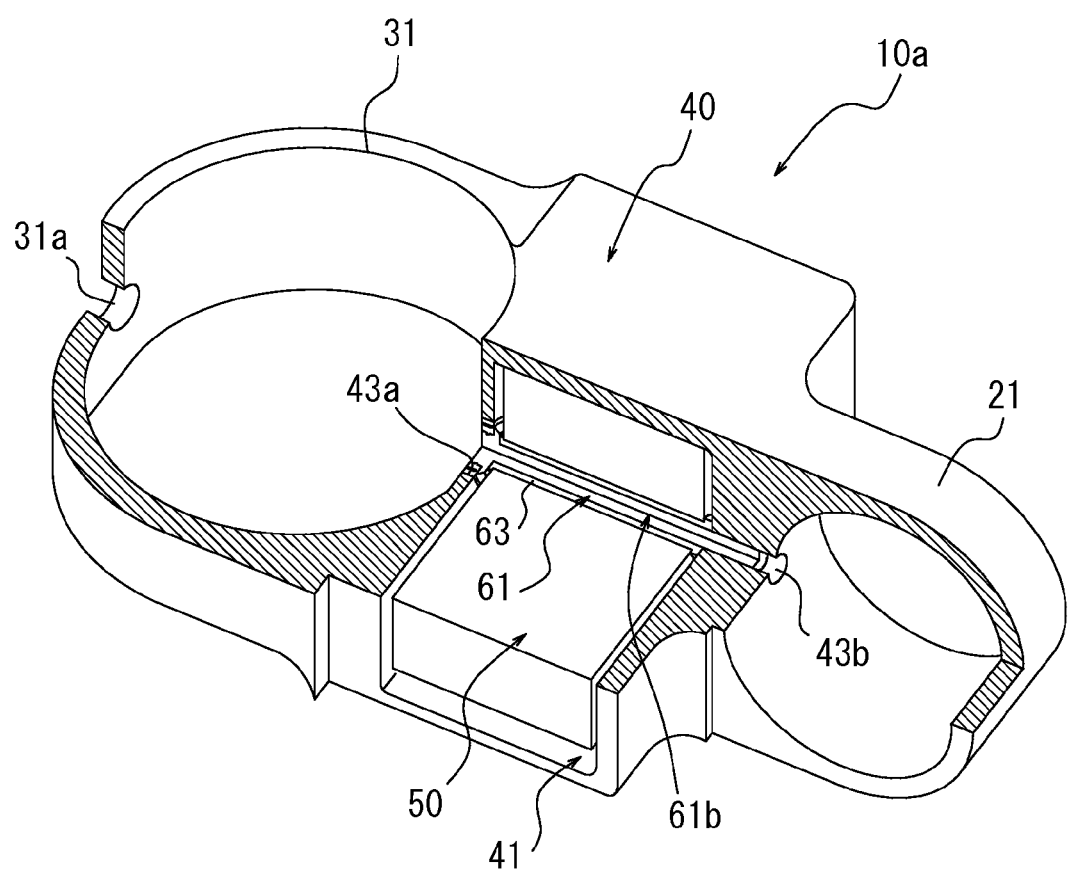
FIG. 13 is a perspective partial cross-section view of a fifth embodiment of the torque rod.

FIG. 13 is a partial cross-section perspective view the of torque rod 10*a* of the fifth embodiment in a posture before the rubber members of each of the two elastic bushes and the inner tube to be disposed. It should be noted that the internal structure of the vibration cancellation means 50 has been omitted in the figure. In the illustrated torque rod 10*a*, a hole 43*a* penetrating from the inner peripheral surface of the large-diameter outer tube 31 where an elastic bush with a small spring constant is formed to the recess 41, and a hole 43*b* penetrating from the inner peripheral surface of the small-diameter outer tube 21 where an elastic bush with a large spring constant is formed to the recess 41, are installed on the central axial of the connecting rod 40, and a shaft 61 penetrating the vibration cancellation means 50 is inserted into both of the penetrating holes 43*a*,43*b* to mount the vibration cancellation means 50 on the connecting rod 40.

Figure 14:
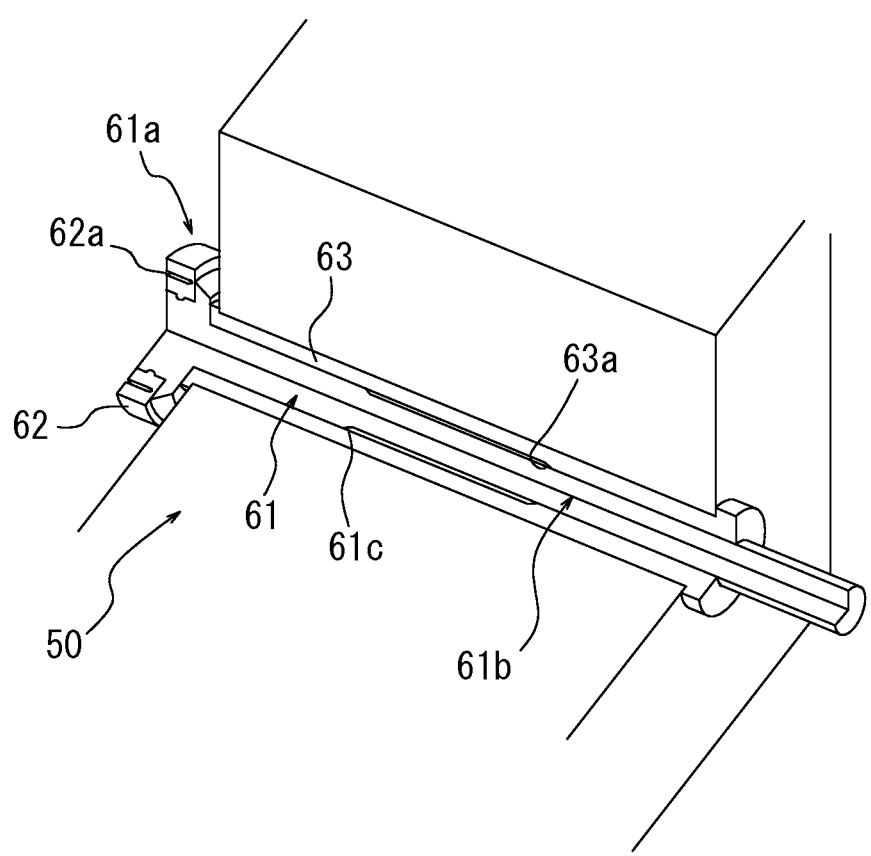
FIG. 14 is an enlarged perspective partial cross-section view showing an essential portion of the torque rod shown in FIG. 13.

As illustrated in the enlarged view in FIG. 14, the shaft 61 has a flange-shaped portion 61*a* located at the end of the large-diameter elastic bush and an elongated bar-shaped pin portion 61*b* forming the remainders. In the area having a slightly reduced diameter at the tip of the flange-shaped portion 61*a*, an annular shaped resin member 62 made from polyamides, aromatic polyamides, polyethylene, polypropylene, or the like is provided, and a region of the pin portion 61*b* at the side of the flange-shaped portion 61*a* has an enlarged diameter via a step 61*c*.

In the torque rod 10*a*, the resin member 62 provided in the flange-shaped portion 61*a* of the shaft 61 is fitted in the penetrating hole 43*a* of the connecting rod 40 to allow the end the shaft 61 at the large-diameter elastic bush side to slide in the axial direction with respect to the connecting rod 40, while the small-diameter tip region of the pin portion 61*b* of the shaft is firmly friction-engaged or press-fitted and fixed at the peripheral surface of penetrating hole 43*b* of the connecting rod 40, and the enlarged diameter region located between the flange-shaped portion 61*a* and the step 61*c* of the pin portion 61*b* of the shaft 61 is firmly friction-engaged onto a tube body 63 of the vibration cancellation means 50. As illustrated in FIG. 14, the inner peripheral surface of tube body 63 of the vibration cancellation means 50 for receiving the shaft 61 inside may have a small-diameter via a step 63*a* on the pin portion 61*b* at the tip side from the step 61*c* of the shaft to, thereby, allow the shaft 61 to be friction-engaged onto the tube body 63 at two places of the enlarged diameter area of the shaft 61 and the region of small-diameter tube body 63. Thus, the so-called oscillating motion of the shaft 61 in the tube body 63 of the vibration cancellation means 50 can be effectively prevented.

It should be noted that in order to prevent the oscillation motion by increasing the adhesiveness between the end portion at the side of the large-diameter elastic bush of the shaft 61 and the peripheral surface of penetrating hole 43*a*, and in order to have a good sliding motion of the end against the peripheral surface of the penetrating hole 43*a*, as illustrated in FIG. 14, it is preferred that, the outer peripheral surface of the flange-shaped portion 61*a* except for the contacting region with the resin member 62 is formed as a tapered shape with the diameter decreasing gradually toward the pin portion 61*b*, whereby only the resin member 62 makes sliding contact with the peripheral surface of penetrating holes 43*a*.

According to the mounting structure of the vibration cancellation means 50 on the connecting rod 40, the resin member 62 provided in the flange-shaped portion 61*a* of the shaft 61 can be slidably displaced in the penetrating holes 43*a* under the action of small friction. Therefore, when a large axial load is applied to the torque rod 10*a* during rapid acceleration or deceleration of the vehicle, the load applied on the vibration cancellation means 50 can be effectively reduced.

In addition, the enlarged diameter area of the pin portion 61*b* of the shaft 61 is firmly friction-engaged onto the tube body 63 of the vibration cancellation means 50, and the bottom of the flange-shaped portion 61*a* is abutted against the tube body 63 of the vibration cancellation means 50, so that the relative displacement of the vibration cancellation means 50 with respect to the shaft 61 is effectively prevented. Also, the vibration cancellation means 50 is firmly fixed to the connecting rod 40 at the small diameter tip area of the pin portion 61*b*, so that a cancellation driving force generated by the vibration cancellation means 50 can be consistently and stably supplied to the connecting rod.

In the illustrated torque rod 10*a*, the shaft 61 is fixed to the connecting rod 40 not at the vibration-generating side but at the vibration-receiving side, so that the shaft 61 can be fixed at the side with a smaller deformation of the connecting rod 40, and the connecting rod 40 can be securely fastened while suppressing the decrease of the press-fitting force caused by the deformation of the connecting rod 40.

In particular, when the torque rod 10*a* is are disposed and used between the engine-side and the vehicle-side, the above-mentioned fixed position of the shaft 61 is set at the vehicle-side, and the input vibration from the engine-side can be absorbed effectively with a cancellation driving force by generated the vibration cancellation means 50 immediately before the input vibration is transmitted to the vehicle-side member. In addition, the end of the fixed side supporting most of the weight of the vibration cancellation means 50 of the shaft 61, in other words, the above-mentioned small diameter tip region of the pin portion 61*b* is fixed to the connecting rod 40 at a location spaced from the engine-side, so that the input vibration from the engine-side is hardly transmitted directly to the vibration cancellation means 50, which can improve the reliability.

When the vibration cancellation means 50 is mounted on the connecting rod 40 in the torque rod 10*a* illustrated in FIG. 13, for example, as illustrated in the FIG. 15*a*, the vibration cancellation means 50 which is not yet attached to the shaft is inserted from an opening of the rectangular recess 41 provided on the side of the connecting rod 40 before disposing the rubber member of the elastic bush and the inner tube. In this state, the vibration cancellation means 50 is disposed in such a manner that the through hole 43a formed on the connecting rod at the side of the large-diameter elastic bush, the through hole 43b formed on the connecting rod at the side of the small-diameter elastic bush, and the central axis of the tube body 63 of the vibration cancellation means 50 are aligned on the central axis of the rod 40.

Figure 15:
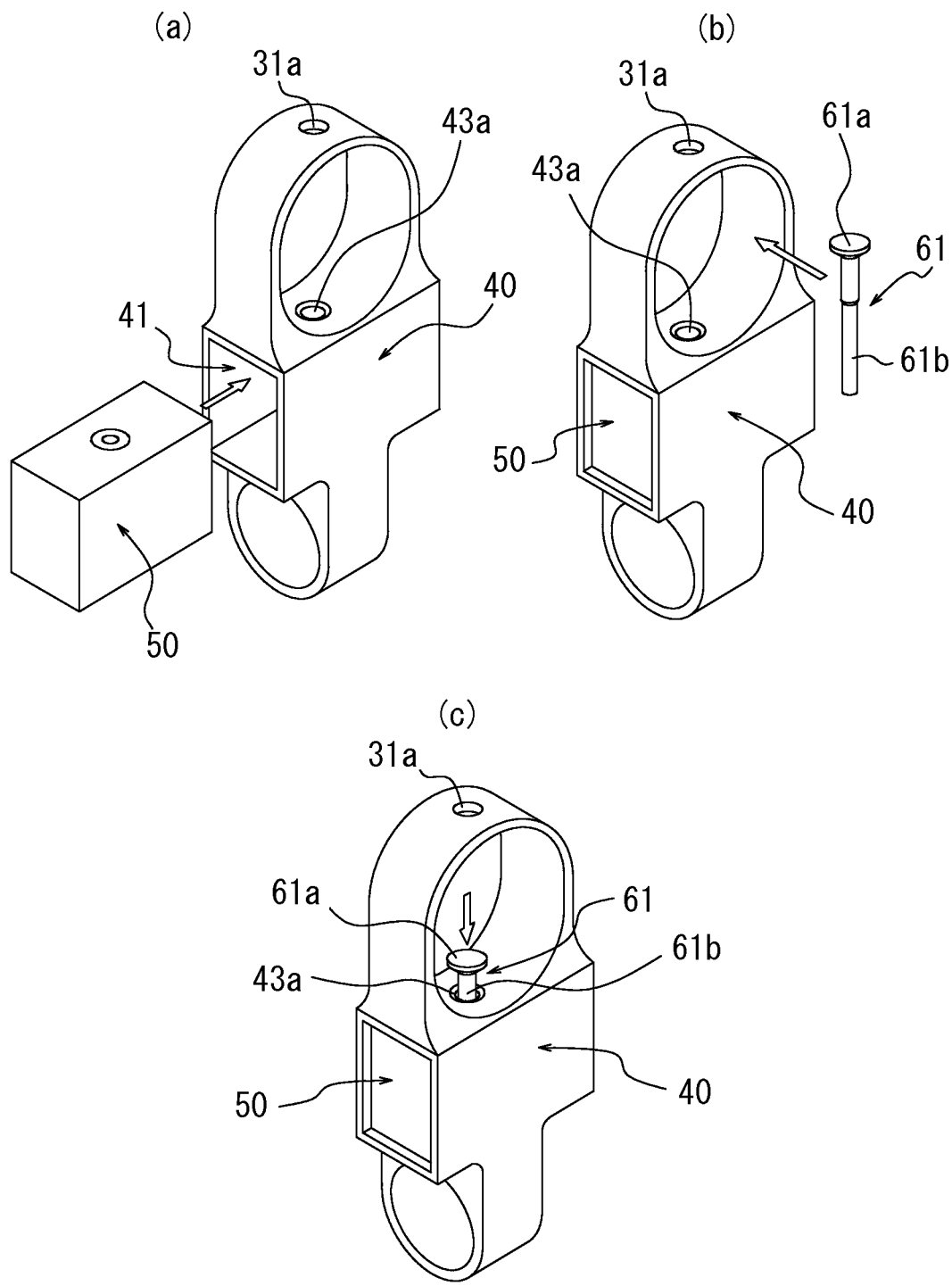
FIG. 15 is a perspective view showing a process of assembling the vibration cancellation means to the connecting rod on the torque rod shown in FIG. 13.
Figure 16:
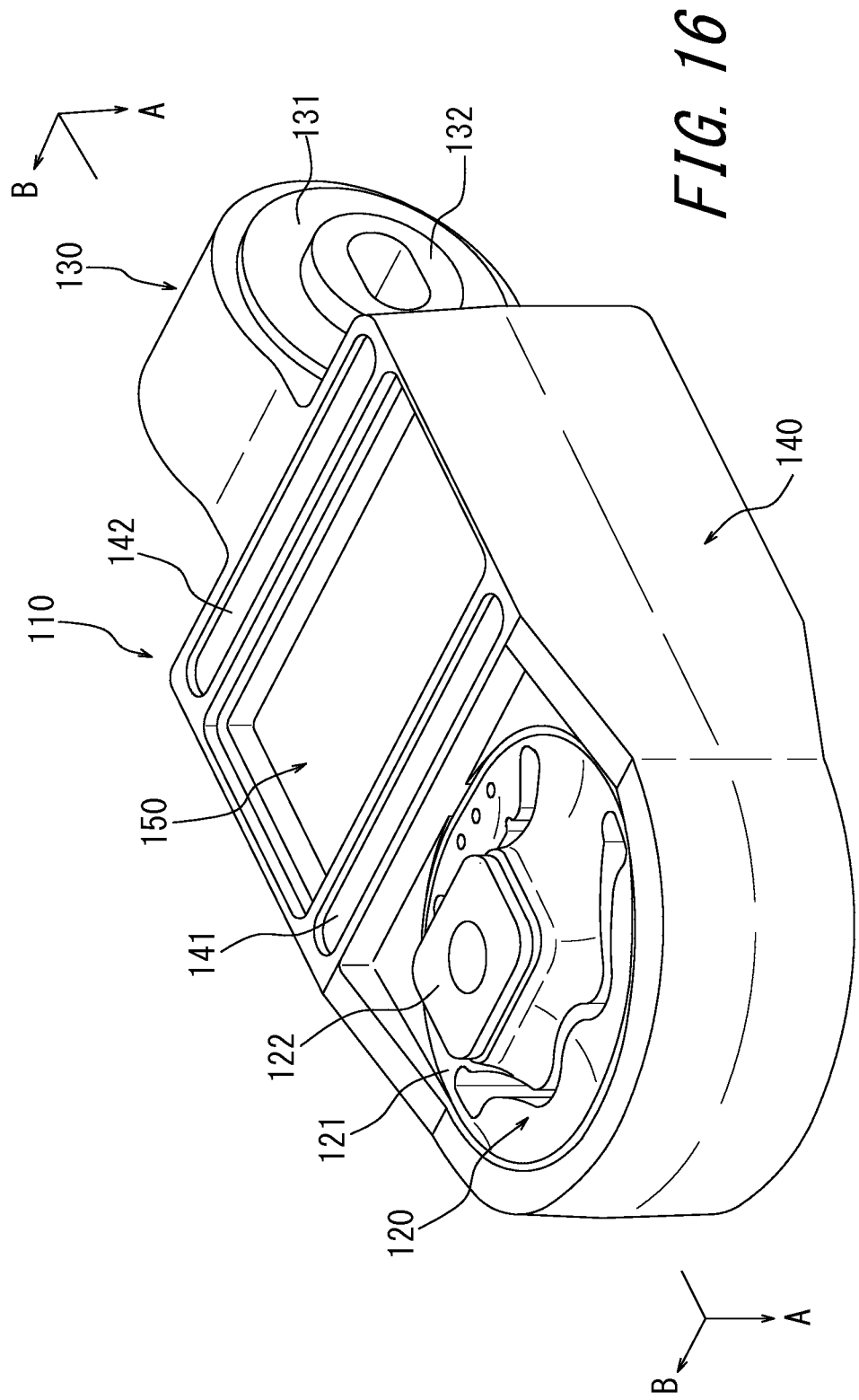
FIG. 16 is a perspective view showing a sixth embodiment of the torque rod.

Thereafter, as illustrated in FIGS. 15 b and c, the shaft 61 is press into the through hole 43b of the connecting rod 40 at the side of the small diameter elastic bush from the through hole 43a formed on the connecting rod 40 at the side of the large-diameter elastic bush, through the inside of the tube body 63 of the vibration cancellation means 50 to friction-engage or press-fit the pin portion 61b of the shaft 61 to the through hole 43b of the connecting rod 40 and to friction-engage the enlarged diameter area of the pin portion 61b to the inner circumferential surface of the tube body 63 of the vibration cancellation means 50. Thus, the shaft 61 is firmly fixed onto the connecting rod 40 and the vibration cancellation means 50. The torque rod 10a is provided with the opening 31a at a position being an extension of the shaft of the outer tube 31, so that a press-in jig for friction-engaging or press-fitting the shaft 61 onto the through hole 43b may be inserted from the opening 31a.

As illustrated in FIG. 14, it is preferred that an annular recess 62a extending toward the vibration cancellation means 50 is formed at the end face of the resin member 62 at the side of the large-diameter bush. This facilitates the deformation of the resin member 62 toward the inner peripheral surface. Thus, not only the resin member 62 may be inserted and arranged in the through hole 43a without requiring a large pressing force when the shaft 61 is installed to the connecting rod 40, but also the shear deformation of the resin member 62 placed between the flange-shaped portion 61a and the through hole 43a may be suppressed when a large axial load is applied to the torque rod 10a. Meanwhile, the placement of the resin member 62 on the shaft 61 achieves an effect that, for example, when the periphery of the vibration cancellation means 50 is sealed by closing a lid after the vibration cancellation means 50 is installed into the recess 41 to improve the durability of the vibration cancellation means 50, it may effectively prevent water or dust from entering the sealed recess 41 through the gap between the shaft 61 and the penetrating hole 43a.

A torque rod 110 of the sixth embodiment illustrated in FIGS. 16 through 19 includes a first elastic bush 120 to be mounted on one of the vibration-generating side or the vibration-receiving side, a second elastic bush 130 to be mounted to the other of the vibration generating side or a vibration-receiving side, and a connecting rod 140 connecting the first and second elastic bushed. Inside of the connecting rod 140, an actively controlled vibration cancellation means 150 having a shaft 151 extending toward the two elastic bushes 120, 130 and a mass member 153 reciprocating in the extending direction of the shaft 151 with respect to the shaft 151 are provided. A shaft 151 of the vibration cancellation means 150 is situated on the connecting rod 140 being spaced in the longitudinal direction of the shaft 151 to provide two gaps 141,142 extending in a direction intersecting the central axial CL direction of the shaft 151 and having a depth beyond an arranged level of the shaft 151 from the upper surface of the connecting rod 140.

In the embodiment illustrated in FIGS. 16 through 19, the elastic bushes 120, 130 consist of the rubber members 121, 131 and rigid inner tubes 122, 132 for the connection with the vibration-generating side and the vibration-receiving side. In addition, the rubber member 121 of the first elastic bush 120 is provided with a cavity 123 penetrating in the central axial direction of the rigid inner tube 122, and the cavity 123 adjusts the spring constant of the rubber member 121.

Figure 18:
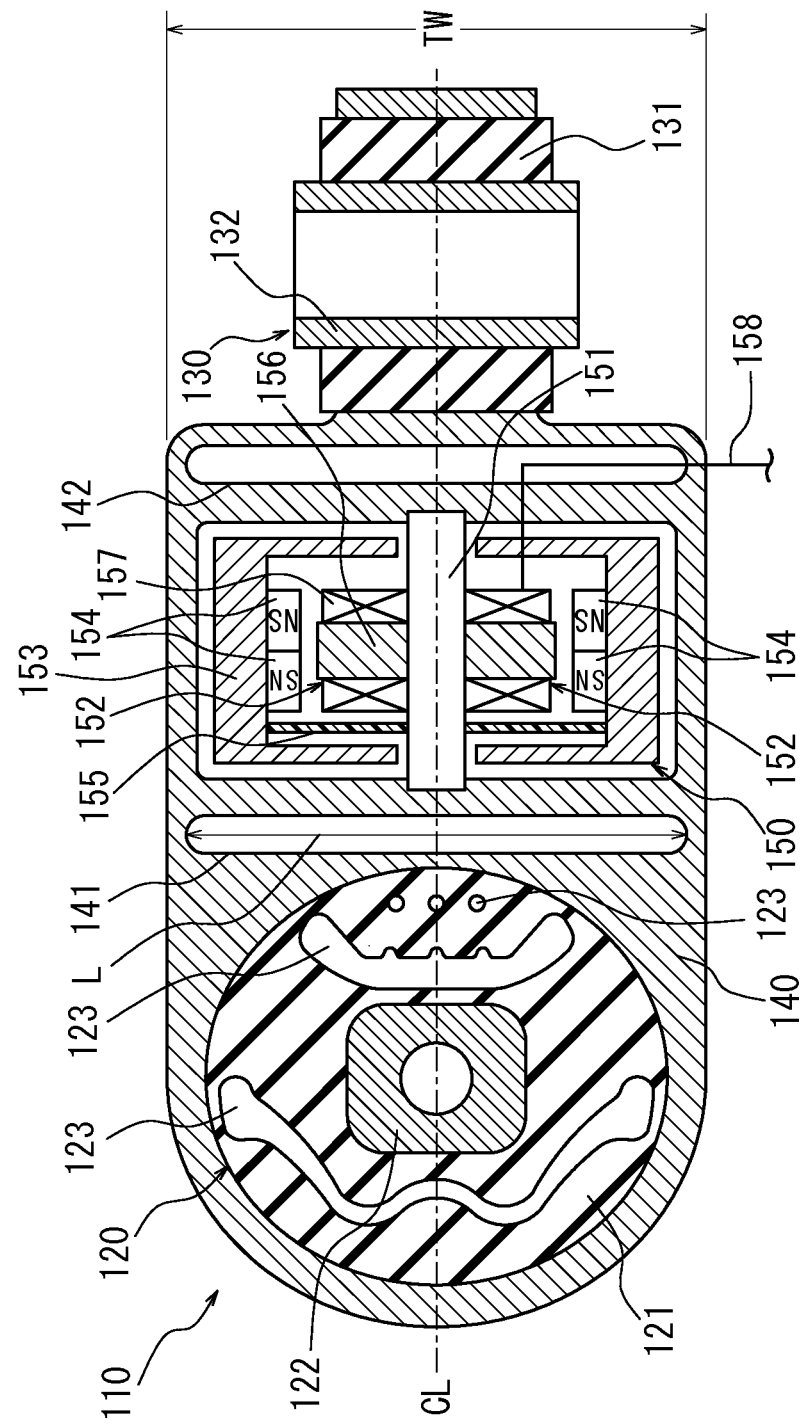
FIG. 18 is a cross-section view of the torque rod shown in FIG. 16 taken along the line A-A.

In addition, as shown in the cross-section view of the torque rod 110 taken along line A-A in FIG. 18, the vibration cancellation means 150 includes a electromagnet 152 amounted to a peripheral surface of the shaft 151, a tube-shaped mass member 153 to surround the shaft 151, a permanent magnet 154 to be mounted to an inner peripheral surface of the mass member 153 opposing the electromagnet 152 in the radial direction of the shaft, and a connecting member 155 connecting the shaft 151 and the mass member 153 to urge the mass member 153 in the axial direction of the shaft 151. The vibration cancellation means 150 reciprocates the mass member 153 by the action of an electromagnetic induction between the permanent magnet 154 and the electromagnet 152.

In the illustrated example, the electromagnet 152 includes a coil 156 wound around a winding core 156 extending in a direction perpendicular to the shaft 151, and the coil 157 is connected to a control means (not shown) through a lead wire 158.

For example, when an input vibration is applied on the torque rod 110, the control means operates feed forward control on the vibration cancellation means 150 in a manner that an opposite vibration to be applied on the mass member 153. In addition, although not shown in the figures, both of the electromagnet and the permanent magnet may be installed on the shaft.

Figure 17:
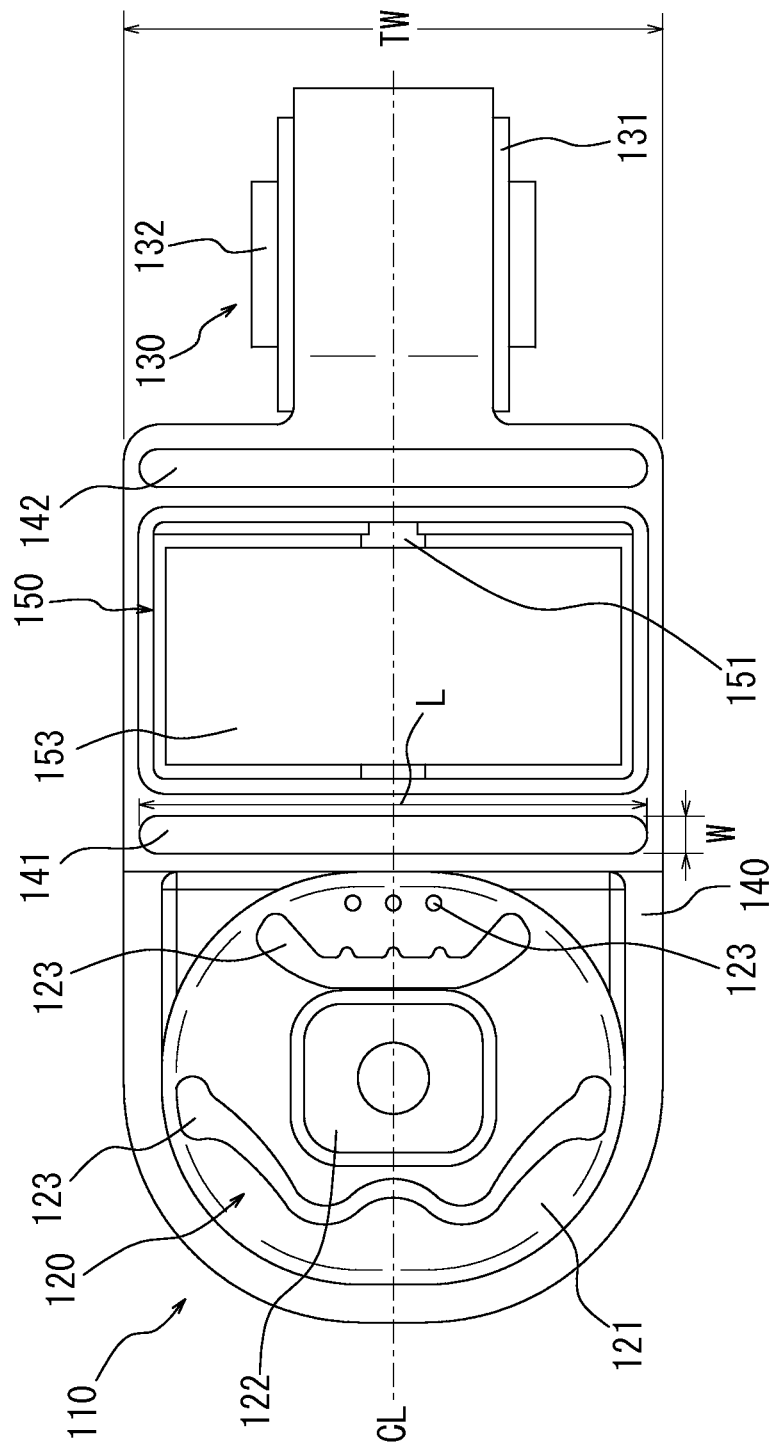
FIG. 17 is a plan view of the torque rod shown in FIG. 16.

As illustrated in FIG. 17 and FIG. 18, both of the gaps 141, 142 of the torque rod 110 have a width W in the central axial line CL direction of the shaft 151 and a length L extending in a direction intersecting perpendicularly to the central axial line CL.

The width W of the gaps 141, 142 is preferably about 0.1 mm to 5.0 mm, and the width W may suitably be formed within this range to sufficiently obtain a desired effect of suppressing the load input to the vibration cancellation means.

In addition, the length L of the gap 141, 142 is preferably about 0.5 times to 0.95 times of the width TW of the torque rod 110. By limiting the length L within the above range with respect to the width TW, the effect of suppressing the load input to the vibration cancellation means may be more reliable.

Figure 19:
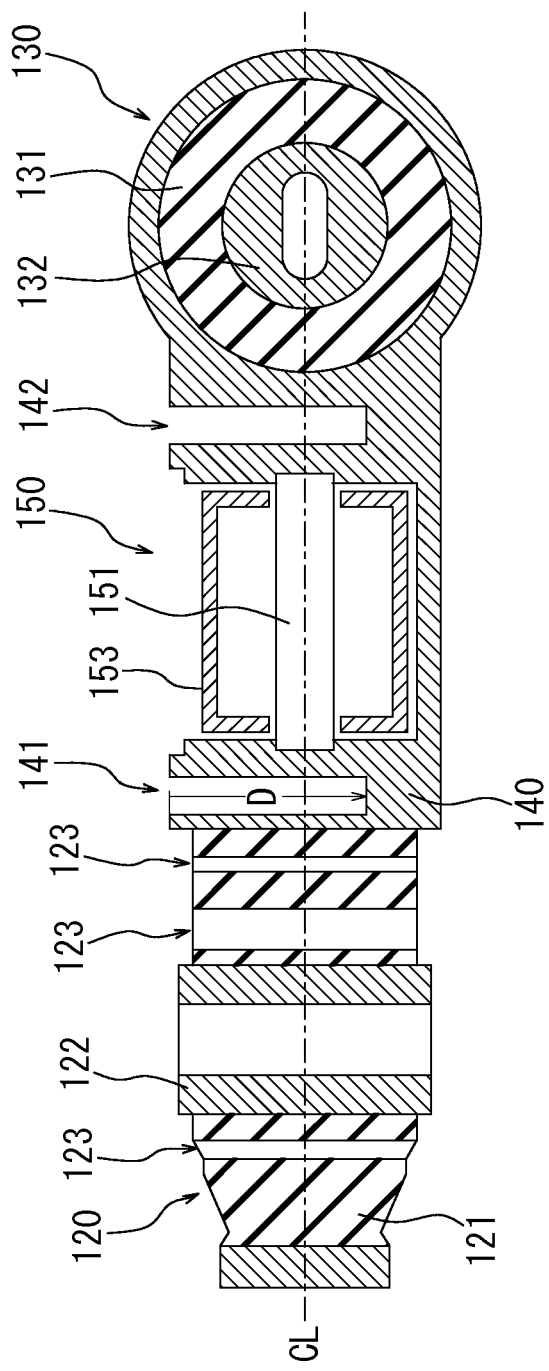
FIG. 19 is a cross-section view of the torque rod shown in FIG. 16 taken along the line B-B.

In addition, as illustrated in FIG. 19, the gaps 141, 142 has a depth D beyond an arranged level of the shaft 151 as measured from the upper surface of the connecting rod 140. In the illustrated example, since the gaps 141, 142 open to the upper surface of the connecting rod 140, the depth D is measured from the upper surface. However, in the present invention, the gaps 141, 142 may open to, for example, the bottom surface or the side surface of the connecting rod 140. In that case, the depth D shall be measured from the surface having the opening.

In addition, the gaps 141, 142 may also be terminated within the connecting rod 140 as in the illustrated example, or, although not illustrated in the figure, the gaps 141, 142 may penetrate the connecting rod 140 in the depth direction of the gaps. In addition, only one gap may be provided to space the shaft 151 of the vibration cancellation means from one of the first elastic bush 120 or the second elastic bush 130 in the longitudinal direction of the shaft 151.

The gaps 141, 142 may also be filled with, for example, elastomeric material such as rubber. Thus, by filling the gaps with the elastomeric material such as rubber for providing an attenuation effect, the vibration in the axial direction of the shaft 151 can be attenuated, and thus the vibration input to the vibration cancellation means can be attenuated. Therefore, the reliability and the durability of the vibration cancellation means are improved to prevent the resonance of the torque rod.

Figure 20:
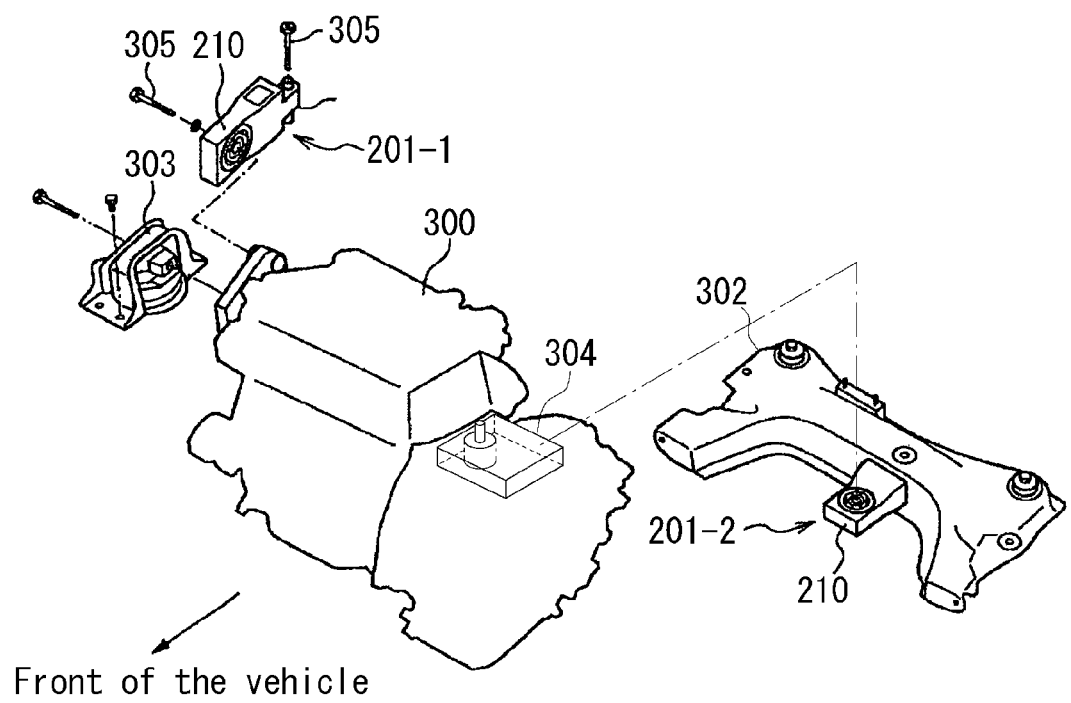
FIG. 20 illustrates the supporting structure of the engine that uses the torque rod according to the present invention.

FIG. 20 illustrates an engine supporting structure that uses the torque rod according to the present invention. In FIG. 20, the left side is the front of the vehicle as illustrated by the arrow mark. The right side of the vehicle is the front of the engine.

An engine 300 is supported by a right engine mount 303 and a left 304 engine mount at two locations above the center of gravity. The right side engine mount 303 supports the engine 300 from the right side of the vehicle. The left engine mount 304 supports the engine 300 from the left side of the vehicle. Such support method is called pendulum method.

The engine 300 inclines around the axis connecting two mounting points due to the rotational inertia force during operation in the structure of pendulum engine mounting system. In order to prevent this inclination, an upper torque rod 201-1, and a lower torque rod 201-2 are provided. The upper torque rod 201-1 is installed on the upper right side of the vehicle, with one end being connected to the engine 300 and the other end being connected to the vehicle body 302. The upper torque rod 201-1 is mounted horizontally to the rod body 210. The lower torque rod 201-2 is installed on the lower side of the vehicle with one end being connected to the engine 300 and the other end being connected to the vehicle body 302. The lower torque rod 201-2 is also mounted horizontally to the rod body 210.

The basic structure of the upper torque rod 201-1 and the lower torque rod 201-2 are identical. In the following, when there is no particular need to distinguish between the upper and lower torque rod, the explanation are referred to the torque rod 201.

FIG. 21 illustrates a seventh embodiment of the torque rod according to the present invention. FIG. 21 (A) is a plan view, FIG. 21 (B) is a front view, and FIG. 21 (C) is a sectional view taken along the line C-C of FIG. 21 (B). It should be noted that in order to avoid the complication of the drawing in FIG. 21 (B), among an inertial mass of the actuator 220 as an actively controlled vibration cancellation means, only the shaft 221 is indicated by a dashed line in particular, and the inertial mass actuator 220 has been omitted in FIG. 21 (C).

The torque rod 201 includes a rod body 210 and an inertial mass actuator 220.

The rod body 210 includes an engine-fixing-portion 211 as one of the two elastic bushes, a vehicle-fixing-portion 212 as the other of the elastic bushes, and a body portion 213 as a connecting rod that connects the elastic bushes with each other.

The engine-fixing-portion 211 includes an outer tube 211a, an inner tube 211b, and an elastic body 211c. The outer tube 211a is fixed by inserting into one end of the body portion 213. The inner tube 211b is concentric with the outer tube 211a. The inner tube 211b is fixed to the engine 300 by inserting a bolt 305 as illustrated in FIG. 20. The elastic body 211c is interposed between the inner tube 211b and the outer tube 211a. The elastic body 211c is, for example, an elastic rubber. The elastic body 211c has not only elastic characteristic but also attenuating characteristic.

The vehicle-fixing-portion 212 has smaller diameter than that of the engine-fixing-portion 211. The vehicle-fixing-portion 212 opens in a direction perpendicular to the engine-fixing-portion 211. Other basic configurations of the vehicle-fixing-portion 212 are the same as the engine-fixing-portion 211. In other words, the vehicle-fixing-portion 212 includes an outer tube 212a to be fixed by inserting into one end of the body portion 213, an inner tube 212b concentric to the outer tube 212a, and an elastic member 212c interposed between the outer tube 212a and the inner tube 212b.

An actuator chamber 2131 is formed on the body portion 213. The actuator chamber 2131 opens toward the same direction as the vehicle-fixing-portion 212. The opening 2131a is located at the outward from a tangent line L passing through the base 2121 of the vehicle-fixing-portion 212 and touching the opening of the engine-fixing-portion 211. As apparent from FIG. 21 (A), the body portion 213 has a constant thickness of at the vehicle-fixing-portion. Also, the body portion 213 has a slightly thinner thickness at the engine-fixing-portion. As apparent from FIG. 21 (B), the width of the body portion 213 reduces at the vehicle-fixing-portion. In FIG. 21 (B), the width is approximately ⅓ at the vehicle-fixing-portion side. The width of the body portion 213 is constant at the engine-fixing-portion side. FIG. 21 (C) is a cross-section view taken along the line C-C of FIG. 21 (B), which illustrates a cross-section in a plane perpendicular to the axis line connecting the engine-fixing-portion 211 and the vehicle-fixing-portion portion 212. From FIG. 21 (C), it can be seen that the opening 2131a of the actuator chamber 2131 opens at the short side of the rectangular of the cross-section in a plane perpendicular to the axis line.

The inertial mass actuator 220 includes a shaft 221, a flat spring 222, as a connecting member, an inertia mass 223 as a mass member, and a force generating portion 224.

The shaft 221 is fixed to the inner wall 2131b of the actuator chamber 2131. The shaft 221 is installed in parallel to the axis line connecting the engine-fixing-portion 211 and the vehicle-fixing-portion 212.

Two flat spring 222 are respectively provided on the engine-side and the vehicle-side of the shaft 221. The flat spring 222 is an elastic element. The flat spring 222 has relatively smaller rigidity.

The inertial mass 223 is disposed around the shaft 221. The inertial mass 223 is coaxial with the shaft 221. The inertia mass 223 is square-tube-shaped. The inertial mass 223 has a rectangle cross-section in a plane perpendicular to the shaft 221. The inertial mass 223 is fixed to both ends of the flat spring 222. The flat spring of the vehicle-side is fixed to the vehicle-side of the sidewall of the inertia mass 223. To the engine side end of the sidewalls of the engine inertia mass 223, the engine side flat spring is fixed. In other words, the fixed portion of the flat spring 222 and mass inertial 223 extends in depth from the front side of the sheet. The inertia mass 223 is a magnetized metal. The cross-section of the inertial mass 223 is horizontally and vertically symmetrical. A part of the inner wall 223a of the inertia mass 223 has a projection toward the permanent magnet 224c of the force generating portion 224.

The force generating portion 224 reciprocates the inertial mass 223 in the axial direction (left-right direction in FIG. 21) of the shaft 221. The force generating portion 224 generates a force corresponding to the speed of the torque rod 201 which has been sent back. Thereby, the force generating portion 224 generates a force to attenuate the vibration of the torque rod 201.

The force generating portion 224 is disposed in a space between the inertial mass 223 and the shaft 221. The force generating portion 224 includes a core 224a as the winding core, a coil 224b, and a permanent magnet 224c.

The core 224a is square-tube-shaped. The core 224a is fixed to the shaft 221. The core 224a is made of a plurality of laminated steel plates. The core 224a constitutes the magnetic path of the coil 224b. The steel plates are fixed to the outer periphery of the shaft 221 to form a square-tube-shaped core 224a as a whole. The coil 224b is wound around the core 224a. The permanent magnet 224c is disposed on the outer peripheral surface of the core 224a.

Because of such a configuration of the force generating portion 224, the reluctance torque due to the magnetic field generated by the coil 224b and the permanent magnet 224c reciprocates the inertial mass 223 in the axial direction of the rod.

Figure 22:
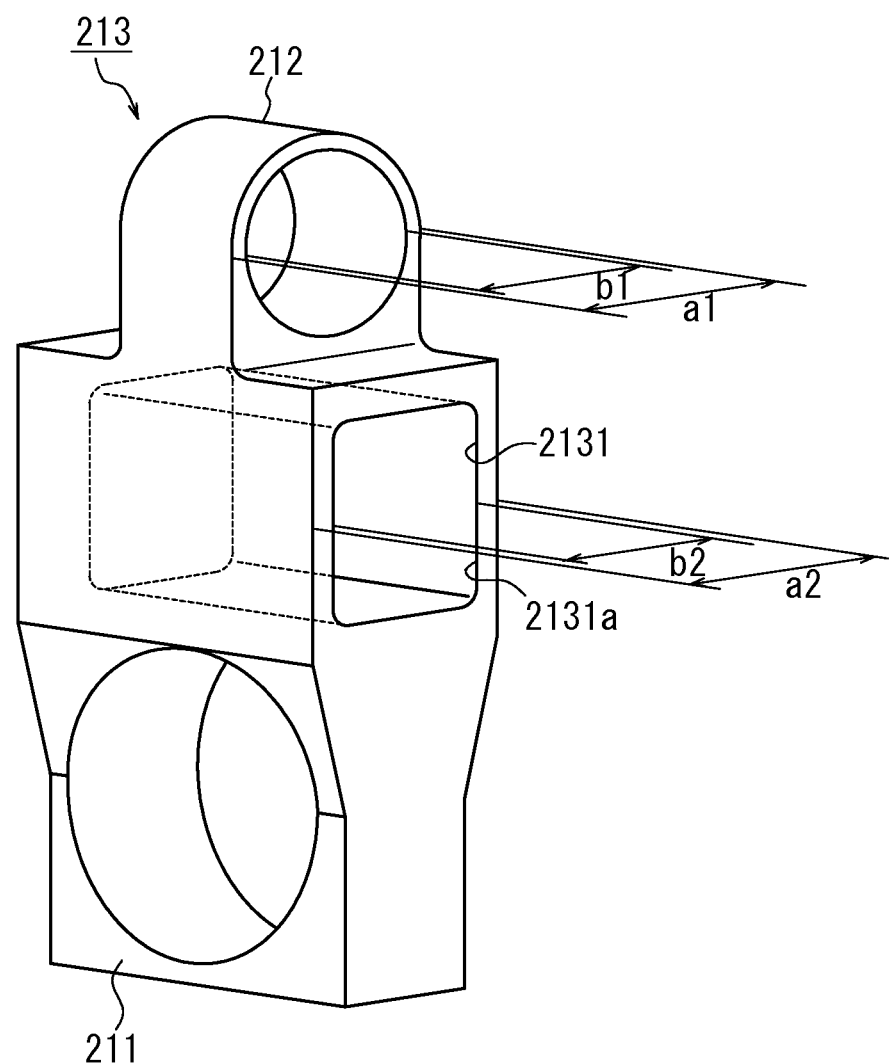
FIG. 22 is a perspective view showing a body portion to be used in a seventh embodiment of the torque rod.

FIG. 22 is a perspective view illustrating a body portion used in the seventh embodiment of the torque rod.

The body portion 213 has a rectangular cross-section in a plane perpendicular to an axis line connecting a fixed portion fixed respectively to the engine-fixing side and the vehicle-fixing side, and an actuator chamber 2131 with an opening at the short side of the rectangular.

The body portion 213 is formed with a hole of the engine-fixing-portion 211 and a hole of the vehicle-fixing-portion 212. The opening of the engine-fixing-portion 211 is perpendicular to the opening 2131a of the actuator chamber 2131. The opening of the vehicle-fixing-portion 212 faces to the same direction as the opening 2131a of the actuator chamber 2131. In other words, the opening of the engine-fixing-portion is perpendicular to the opening of the vehicle-fixing portion 212. The thickness of the body portion 213 near the vehicle-fixing-portion is identical with the thickness a2 near the actuator chamber. In other words, the body portion 213 has a constant thickness at the side of the vehicle-fixing-portion. Also, the opening diameter b1 of the hole at the side of the vehicle-fixing-portion is identical with the opening length b2 of the actuator chamber.

Figure 23:
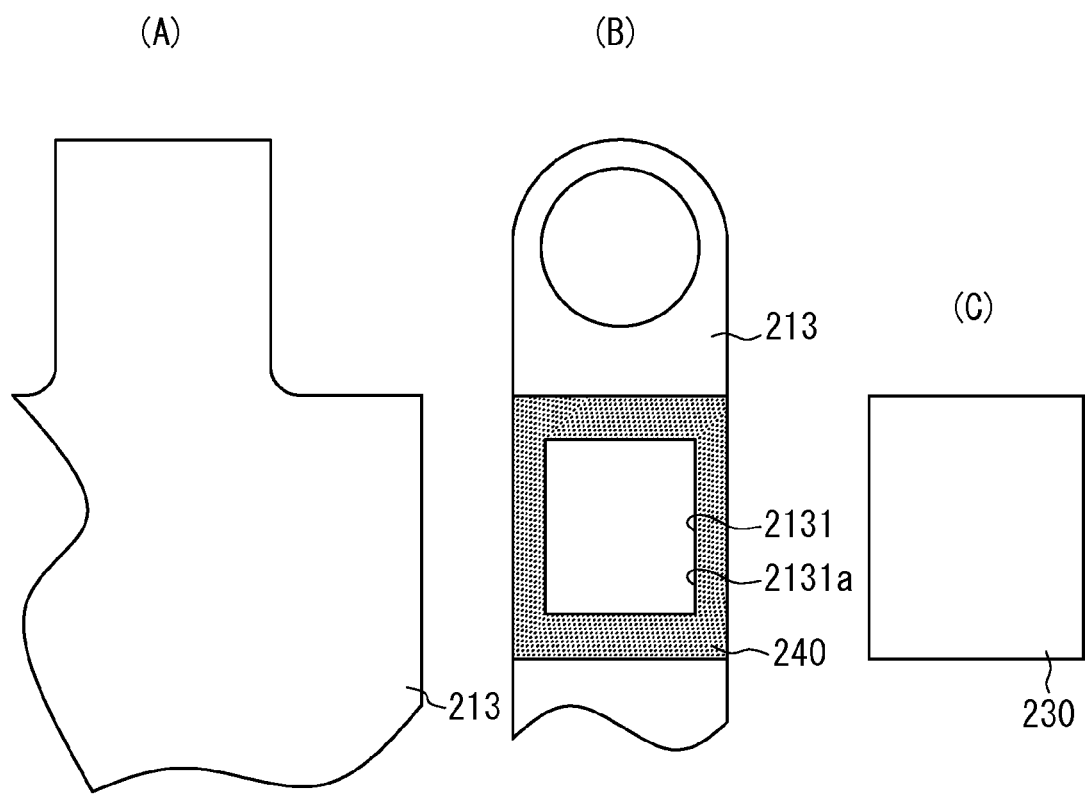
FIG. 23 illustrates the lid to be used in a seventh embodiment of the torque rod.

FIG. 23 illustrates a lid used in the torque rod of the seventh embodiment, FIG. 23 (A) is a partially enlarged front view of the torque rod, FIG. 23 (B) is a partially enlarged side view of the torque rod, and FIG. 23 (C) illustrates the lid.

The lid 230 closes the opening 2131a of the actuator 2131 chamber formed on the body portion 213. The lid 230 is fixed by an adhesive 240 applied on the opening 2131a of the actuator chamber 2131. The lid 230 is made of metal with good thermal conductivity. By installing such lid 230, the actuator chamber 2131 may maintain waterproof and dustproof inside.

Figure 24:
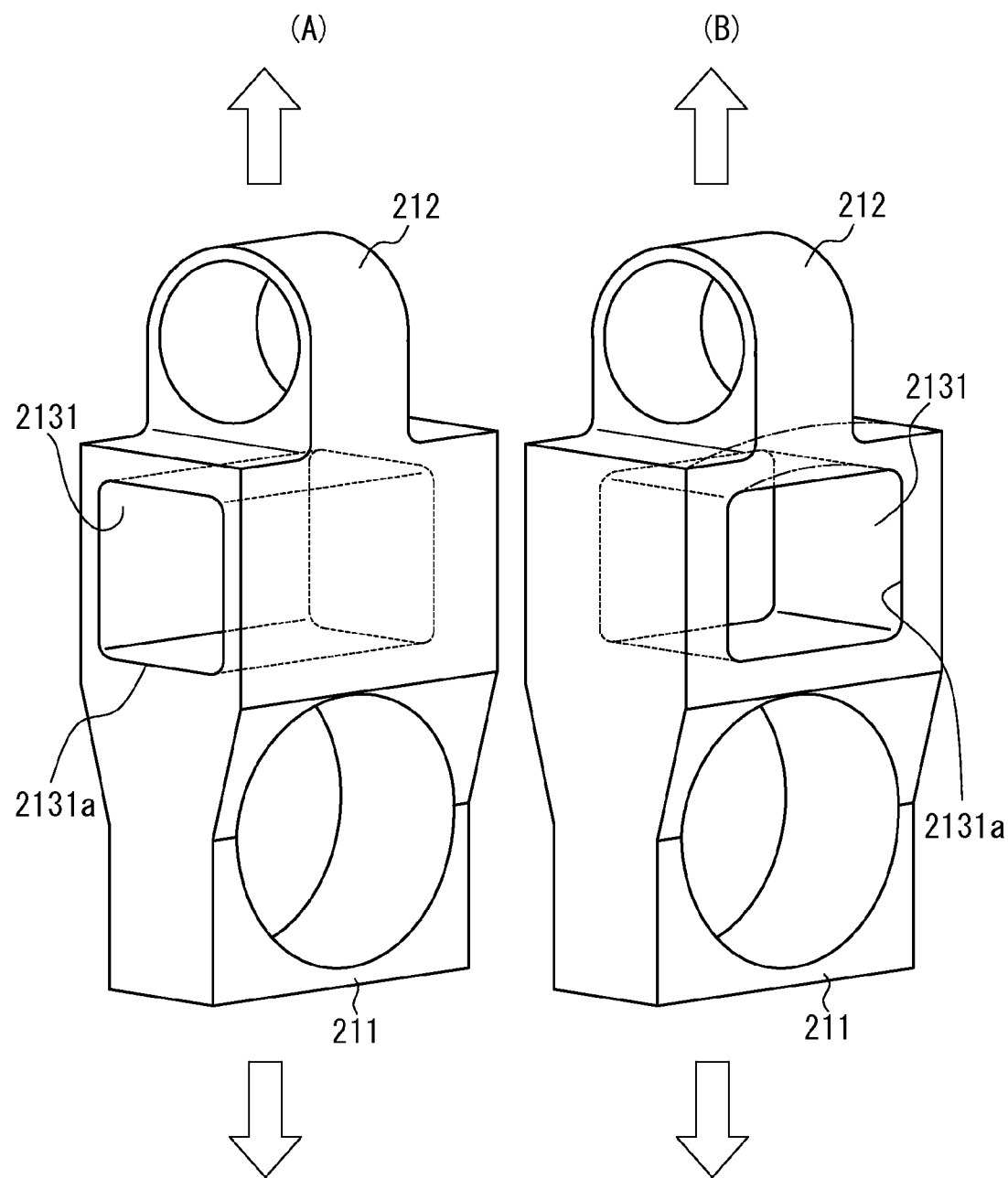
FIG. 24 illustrates the operation and the effects of the seventh embodiment of the torque rod.

FIG. 24 illustrates the effects of the seventh embodiment of the torque rod according to the present invention. FIG. 24 (A) illustrates a state in which a tensile force is applied to the present embodiment, and FIG. 24 (B) illustrates a state in which a tensile force is applied to the comparison example.

The present embodiment has the actuator chamber 2131 having an opening at the short side of the rectangular cross-section in a plane perpendicular to the axis line connecting the engine-fixing-portion 211 and the vehicle-fixing-portion 212 as described above, while the comparison example has an opening at the long side of the rectangular. With such a configuration, the opening 2131a of the actuator chamber 2131 is located inward from a tangent line passing through the base 2121 of the vehicle-fixing-portion 212. In the comparison example, when a large tensile force as illustrated by the arrows is applied to the engine-fixing-portion 212 and the body fixing porting 211, as illustrated by an alternate long and short dash line in FIG. 24 (B), the shoulder portion of the body portion 213 is deformed, and the opening 2131a is deformed. Therefore, there is a possibility that the lid 230 deviates. There is also a possibility that the noise may occur due to the resonance from the partially deviated lid 230 hitting the body portion 213.

In contrast, in the present embodiment, the actuator chamber 2131 has an opening at the short side of the rectangular cross-section in a plane perpendicular to the axis line connecting the engine-fixing-portion 211 and the vehicle-fixing-portion 212. With such a configuration, the opening 2131a of the actuator chamber 2131 is located outward from a tangent line passing through the base 2121 of the vehicle-fixing-portion 212. In other words, the actuator chamber 2131 includes an opening 2131a opens to the outer surface of the body portion 213. The opening 2131a is located in the portion deviated from a space (three-dimensional range) defined by connecting the engine-fixing-portion 211 and the vehicle-fixing-portion 212. When a large tensile force is applied to the engine-fixing-portion 211 and the vehicle-fixing-portion 212 as illustrated with the arrows, the tensile force mainly acts on the inner surface than the tangent line L. Therefore, even if a large tensile force is applied to the configuration of the present invention as illustrated in FIG. 24 (A), the opening 2131a has substantially no deformation. The lid 230 hardly deviate, and noise occurrence may be prevented.

Figure 25:
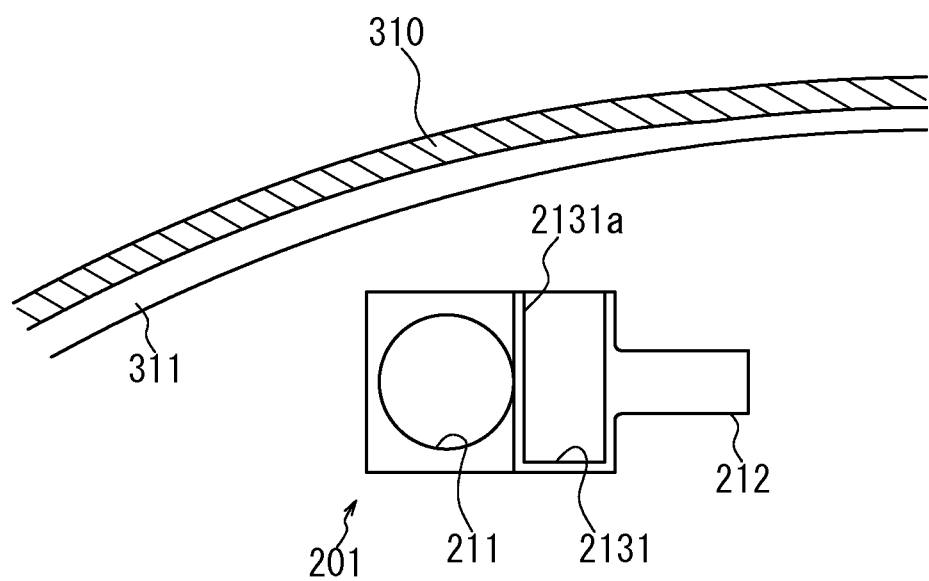
FIG. 25 illustrates the operation and the effects of the seventh embodiment of the torque rod.

FIG. 25 illustrates the operation and the effects of a seventh embodiment of the torque rod according to the present invention.

The torque rod 201 is preferred to be mounted to a vehicle with the opening 2131a of the actuator chamber 2131 facing a hood 310. In this way, even if a noise occurs when part of the lid 230 has deviated, the noise is absorbed by a soundproof material 311 which is affixed to the bottom of the hood 310. Therefore the quietness may be maintained inside of the vehicle cabin.

According to this embodiment, since the lid 230 is made of metal, it has good thermal conductivity and good heat dissipation. Accordingly, the heat is dissipated even if the inertial mass actuator 220 generates the heat, which can suppress the temperature rise of the inertial mass the actuator 220. This allows a large amount of electric power to be supplied to the inertial mass actuator 220, so that the inertial mass actuator 220 can generate a large force.

The thickness a1 near the vehicle-fixing-portion of the body portion 213, as illustrated in FIG. 22, is equal to the thickness a2 near the actuator chamber. In other words, the body portion 213 has a constant thickness at the vehicle-fixing-portion side. The opening diameter b1 of the hole of the vehicle-fixing-portion side is equal to the opening length b2 of the actuator chamber. Therefore, the stress concentration according to the change of the thickness of the rod body 210 may be prevented. Therefore, the deformation of the opening 2131a can also be suppressed.

The inertial mass member 223 has a rectangular cross-section in a plane perpendicular to the shaft 221. The mass member 223 is adapted to have a higher density of mass at a portion facing to the permanent magnet 224c than a density of mass at the remainder. Therefore, the opening area of the actuator chamber 2131 is small and the deformation of the opening 2131a can be suppressed.

Figure 26:
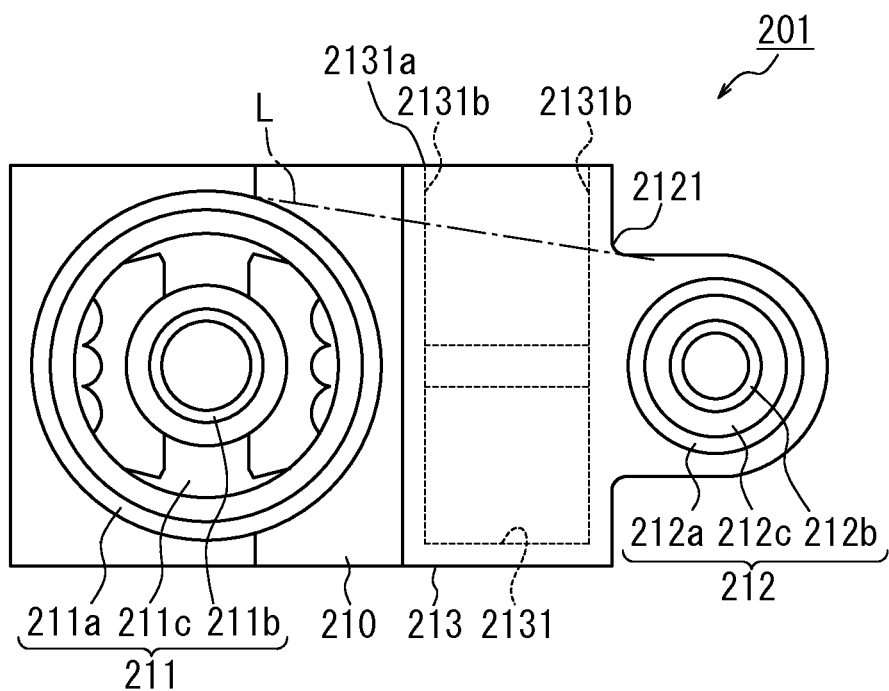
FIG. 26 illustrates an eighth embodiment of the torque rod.

FIG. 26 illustrates an eighth embodiment of the torque rod according to the present invention.

It should be noted that in the following description, the same reference numerals are applied to the elements that fulfill the same function as described above, and the explanation thereof is arbitrarily omitted.

The body portion 213 of the torque rod 201 of the present embodiment has the opening of the engine-fixing-portion 211 perpendicular to the opening 2131a of the actuator chamber 2131. The opening of the vehicle-fixing-portion 212 is also perpendicular to the opening 2131a of the actuator chamber 2131. In other words, the opening of the engine-fixing-portion 211 faces the same direction as the opening of the vehicle-fixing-portion 212. It should be noted that in this embodiment, same as the seventh embodiment, the opening 2131a of the actuator chamber 2131 is located outward from a tangent line passing through the base 2121 of the vehicle-fixing-portion 212.

Even with such a configuration, when a large tensile force is applied, the opening 2131a of the actuator chamber 2131 almost has no deformation as with the case of the seventh embodiment. The lid 230 hardly deviates, and the noise can be prevented.

Figure 27:
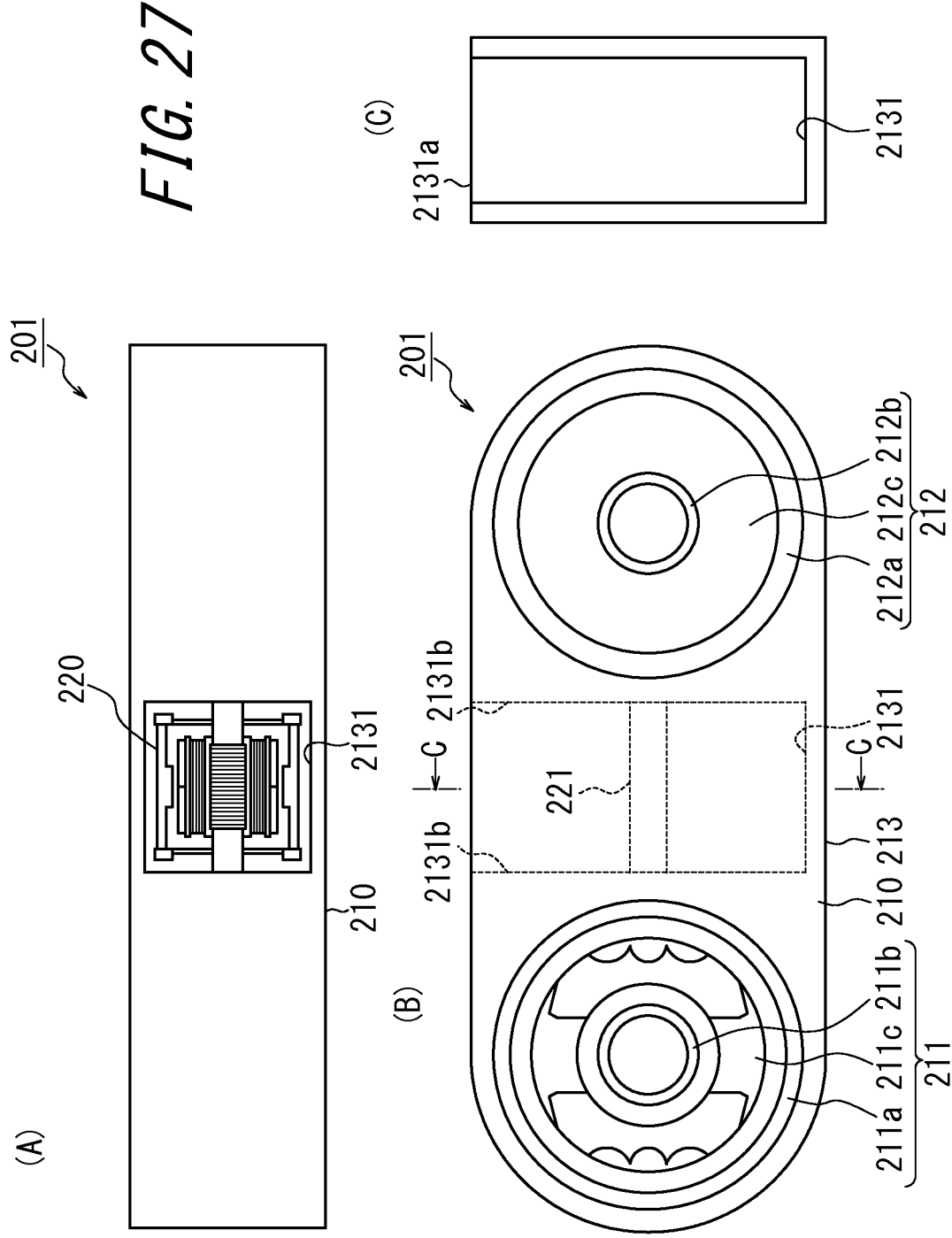
FIG. 27 illustrates a ninth embodiment of the torque rod.

FIG. 27 illustrates a ninth embodiment of the torque rod according to the present invention. FIG. 27 (A) is a plan view, FIG. 27 (B) is a front view, and FIG. 27 (C) is a cross-section view taken along the line C-C of FIG. 27 (B). In order to avoid the complexity of the drawings, the actuator 220 is illustrated in the same manner as in FIG. 21.

The torque rod 201 of the present embodiment has the vehicle-fixing-portion 212 having the same diameter as the engine-fixing-portion 211.

As illustrated in FIG. 27 (C), the actuator chamber 2131 formed on the body portion 213 opens at the short side of the rectangular of the cross-section in a plane perpendicular to the axis line connecting the fixing portions fixing respectively on the engine and the vehicle.

In this manner, comparing to the actuator chamber 2131 opening at the long side of the rectangular cross-section, the present configuration can suppress the deformation of the opening 2131a of the actuator chamber 2131, the lid 230 hardly deviates, and the noises are less likely to occur.

Figure 28:
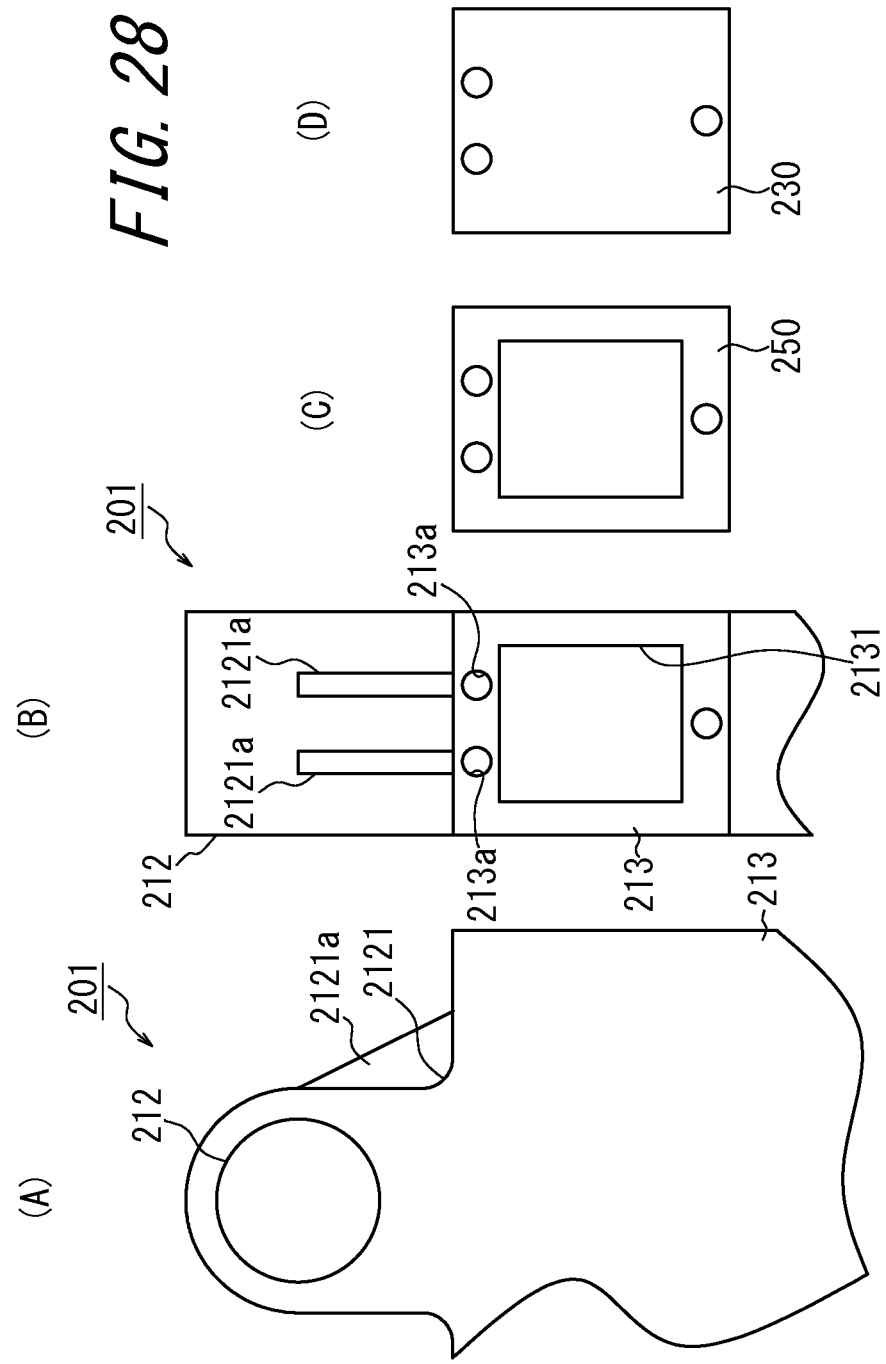
FIG. 28 illustrates a tenth embodiment of the torque rod.

FIG. 28 is a diagram illustrating a tenth embodiment of the torque rod according to the present invention. FIG. 28 (A) is a partially enlarged front view of the torque rod. FIG. 28 (B) is a partially enlarged side view of the torque rod. FIG. 28 (C) illustrates a seal, and FIG. 28 (D) illustrates the lid.

The torque rod 201 of the present embodiment has ribs 2121a formed at the base 2121 of vehicle-fixing-portion 212. As illustrated in FIG. 28 (B), screw holes 213a are provided in an extension of the ribs 2121a for fixing the lid as viewed from the opening sides of the actuator chamber 2131. At this area, the lid 230 is fixed with bolts through the medium of the seal 250.

According to this configuration, the stress of the portion to be connected to the lid 230 can be reduced, and the deformation of the lid 230 can be suppressed. Thereby, the noise generated from the lid 230 can be suppressed.

FIG. 29 illustrates a lid to be used for the eleventh embodiment of the torque rod according to the present invention. FIG. 29 (A) is a front view of the lid. FIG. 29 (B) is a cross-section view taken along B-B of FIG. 29 (A). FIG. 29 (C) is a cross-section view taken along the line C-C of FIG. 29 (A).

The lid 230 of the present embodiment is curve-shaped with the surface projecting outwardly. The ribs 231 are formed at the inner surface of the lid 230. As illustrated in FIG. 29 (C), three ribs 231 are formed in this embodiment. The ribs 231 are in parallel to the axis line connecting the engine-fixing-portion 211 and the vehicle-fixing-portion 212. As illustrated in FIG. 29 (B), the ribs 231 become taller from the edge towards the center.

Figure 30:
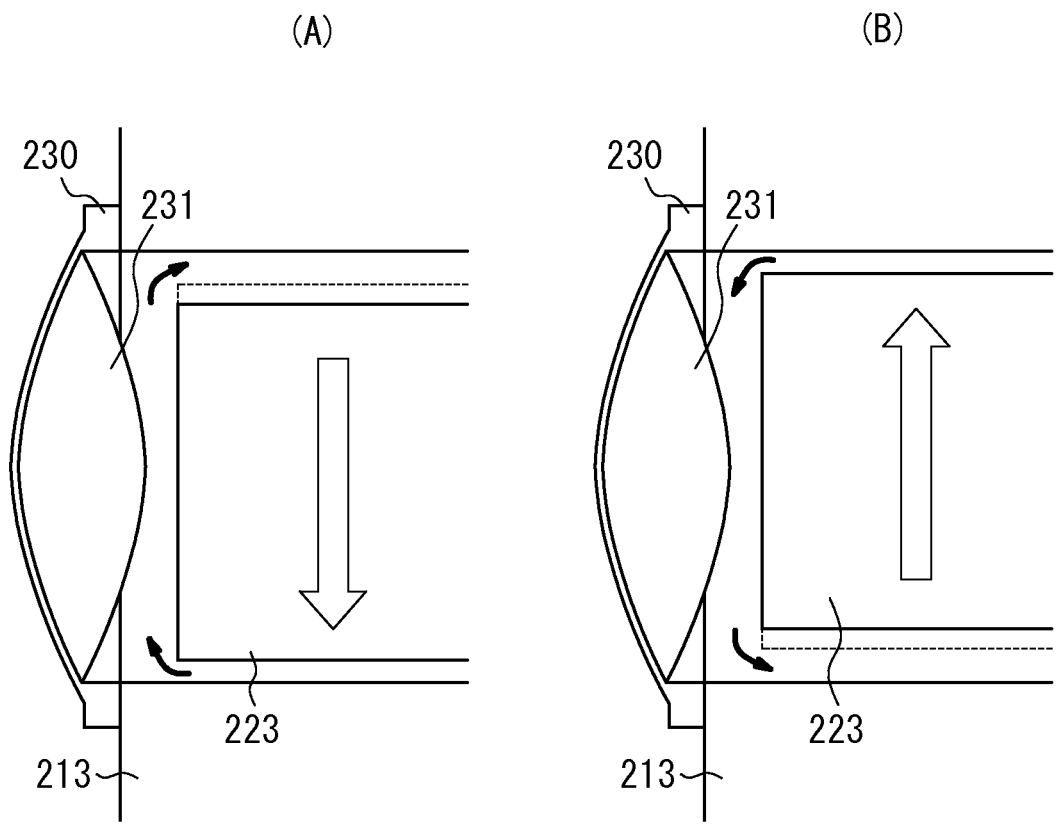
FIG. 30 illustrates the operation and the effects caused by the lid to be used in the eleventh embodiment of the torque rod.

FIG. 30 illustrates the operation and the effects of the lid to be used for an eleventh embodiment of the torque rod according to the present invention.

In the torque rod 201, the inertial mass actuator 220 generates a force so as to attenuate the vibration of the torque rod 201 and reciprocates the inertial mass 223 in the axial direction (vertical direction in FIG. 29) of the shaft 221. In this state, if ribs 231 are formed at the inner surface of the lid 230 as in this embodiment, at the time the inertial mass 223 moves down as illustrated in FIG. 30 (A), air rises along the ribs 231. When the inertial mass 223 is rising up as illustrated in FIG. 30 (B), the air moves down along the ribs 231. Even though the inertial mass actuator 220 generates heat, it may efficiently dissipate the heat, which may suppress the temperature rise of the inertial mass actuator 220.

In this embodiment, particularly, ribs 231 become taller toward the center from the edge, the cross-section area of the air-flow-path is narrowed, when the air flow speed increases, the heat dissipation area increases. Therefore, the characteristic of the heat dissipation is especially excellent.

Therefore, a large amount of electric power may be supplied to the inertial mass actuator 220, so that a large force may be generated from the inertial mass actuator 220.

With the ribs 231 being provided, the moment of inertia of area is increased, and the resonance excitation can be suppressed. Since the intensity increases, even if there is excessive input by accident, it is hard to make damages.

FIG. 31 illustrates a lid to be used for a twelfth embodiment of the torque rod according to the present invention, FIG. 31 (A) is a plan view of the lid, FIG. 31 (B) is a sectional view taken along the line B-B of FIG. 31 (A).

An acceleration sensor 241 is fixedly arranged on the lid 230 of the present embodiment. The signal of the acceleration sensor 241 is sent back, and the force generating portion 224 generates force. Thus, the force generating portion 224 generates force to attenuate the vibration of the torque rod 201.

The bolt 251 securing the acceleration sensor 241 is disposed directly above the ribs 231.

According to the present embodiment, by fixedly arranging a heavy load (an acceleration sensor 241) on the lid 230, the resonant frequency of the lid 230 reduces. Thus, the vibration cancellation range of the lid 230 may be enlarged. Also, since the rigidity of the mounting surface of the sensor increases, the noise to be input to the sensor can be reduced. Moreover, by disposing the bolt 251 immediately above the ribs 231, the deformation of the lid 230 caused by the concentration of the heavy load can be suppressed.

The present invention is not limited to the embodiments described above, and various variations and modifications are possible within the scope of the technical idea thereof; evidently they are included in the technical scope of the present invention.

For example, in the eleventh embodiment, the ribs 231 are formed at the inner surface, in other words, they are formed at the actuator-chamber-side. However, if only the strength of the lid 230 is the focus, the ribs 231 may be formed at the opposite side of the actuator chamber. Also, it may be formed on both inside and outside of the actuator chamber.

EXAMPLES

In accordance with the configuration of the torque rod 110 illustrated in FIGS. 16 through 19, torque rods having gaps 141, 142 with different lengths L are prepared form aluminum casted, as illustrated in FIGS. 32(a) and 32(b), which torque rods are referred to as examples 1 and 2. The length L, width W, and depth D of the gap, and the width of the torque rod TW are listed in Table 1.

Next, torque rods having the same configurations as examples 1 and 2 except for not having any gaps are prepared from cast iron and cast aluminum, which are referred to as comparative examples 1 and 2.

A compressive load of 8000 N is applied to each of the torque rods thus prepared in the axial direction of the shaft, and then the load (N) input to the shaft of the vibration cancellation means is measured. The results are shown in Table 1.

In this measuring test, the above-mentioned compressive load is presumed input load on the torque rod caused by the vehicle deformation at the time inputting the impact load, 8000 N is approximately two times as the input load (3000 to 4000 N) generated on the torque rod of the vehicle at the time of full throttle.

TABLE 1

| | Material of the connecting rod | Gap Length L mm | Gap Width W mm | Gap Depth D mm | Torque Rod Width W mm | Input Load on the Shaft N | Ratio |
|---|---|---|---|---|---|---|---|
| Comparative Example 1 | cast aluminum | — | — | — | 94 | 5957 | 74% |
| Comparative Example 2 | cast iron | — | — | — | 94 | 5311 | 66% |
| Example 1 | cast aluminum | 45 | 3 | Penetrating | 94 | 2780 | 35% |
| Example 2 | cast aluminum | 80 | 3 | Penetrating | 94 | 894 | 11% |

In Table 1, the "ratio" refers to the percentage of load (N) input to the shaft with respect to the compressive load 8000 N applied on the torque rod. In addition, in regards to the depth D of the gap, the term of "penetrating" means that the gap penetrates in the thickness direction of the torque rod.

Table 1 shows that, as compared with the torque rods of comparative examples 1 and 2, examples 1 and 2 reduce the input load to the shaft greatly. In addition, by comparing examples 1 and 2, the longer the length of the gap L is, the greater the load input to the shaft is reduced From the above results, the torque rod illustrated in FIGS. 16 through 19 may effectively suppress the load input to the vibration cancellation means having a shaft.

It is noted that, in the evaluation test, the gap penetrating in the thickness direction of the torque rod is recited by way of example, but the present invention may have a gap with, for example, a few mm space left without penetrating the torque rod.

REFERENCE SYMBOLS 1, 10, 10a, 110, 201 Torque rod
2, 3, 20, 30, 120, 130 Elastic bush
4, 40, 140 Connecting rod
5, 50, 150, 220 Actively Controlled Vibration Cancellation Means
5a, 51, 61, 151, 221 Shaft
5b, 52, 153, 223 Mass member
5e, 55, 157, 224b Coil
5f, 56, 156, 224a Winding core
5d, 54, 154, 224c Permanent magnet
5c, 53, 155, 222 Connecting member

The invention claimed is:

1. A torque rod comprising two elastic bushes to be mounted respectively to a vibration-generating side and a vibration-receiving side, and a connecting rod connecting the two elastic bushes, wherein an actively controlled vibration cancellation means configured to relatively displace a mass member from an originally arranged position toward the two elastic bushes around a shaft extending toward the two elastic bushes is provided in the connecting rod, and the actively controlled vibration cancellation means comprises an actuator including: the shaft having two opposite ends, each end of the shaft being mounted to the connecting rod and extending in an axial direction of the connecting rod; the mass member shaped in a tube to surround the shaft and reciprocatively displaced to generate a vibration in a phase opposite of that of the input vibration from the vibration-generating side in the axial direction of the torque rod due to the active control; a coil and a winding core fixed to the shaft in the tube-shaped mass member; at least one permanent magnet mounted to an inner peripheral surface of the tube-shaped mass member or the shaft; and a connecting member for connecting at least one end of the tube-shaped mass member to the shaft.

2. The torque rod according to claim 1, wherein the ends of the shaft of the vibration cancellation means are respectively mounted to opposing walls adjacent to the elastic bushes, and at least one end of the shaft is mounted to the connecting rod in a manner that allows a relative displacement in the central axial direction of the shaft with respect to the connecting rod.

3. The torque rod according to claim 2, wherein the one end of the shaft of the vibration cancellation means relatively displaceable with respect to the connecting rod, in a posture in which the elastic bushes are respectively mounted to the vibration-generating side and the vibration-receiving side, is disposed at the vibration-generating side.

4. The torque rod according to claim 2, wherein the one end of the shaft of the vibration cancellation means is disposed to insert into a hole formed on the adjacent wall of the connecting rod.

5. The torque rod according to claim 4, wherein the other end of the shaft of the vibration cancellation means opposed to the relatively displaceable one end is press-fitted and fixed into the adjacent wall of the vibration-receiving side.

6. The torque rod according to claim 4, wherein an elastic member is interposed between the one end of the shaft of the vibration cancellation means and the hole of the connecting rod.

7. The torque rod according to claim 1, wherein the connecting rod has a gap at least between one of the elastic bushes and one of the ends of the shaft of the vibration cancellation means in the longitudinal direction of the shaft, the gap extending in a direction intersecting the central axial direction of the shaft and having a depth beyond an arranged level of the shaft.

8. The torque rod according to claim 7, wherein two gaps are provided to separate the shaft of the vibration cancellation means from the two elastic bushes respectively in the longitudinal direction of the shaft.

9. The torque rod according to claim 7, wherein the gap is filled with elastomeric material.

10. The torque rod according to claim 1, further comprising a rod body having a rectangular cross-section in a plane perpendicular to an axis line connecting the elastic bushes fixed respectively to the vibration-generating side and the vibration-receiving side, and an actuator chamber with an opening at the short side of the rectangular cross-section,
wherein the actuator is installed through the opening into the actuator chamber and reciprocates the mass member along the shaft paralleled with the axis line to reduce the vibration transmitted to the rod body.

11. The torque rod according to claim 10, wherein the mass member has a rectangular cross-section in a plane perpendicular to the shaft.

12. The torque rod according to claim 10, wherein the actuator comprises: the shaft fixed to an inner wall of the actuator chamber, the winding core fixed to the shaft, the coil wound around the winding core, and the at least one permanent magnet disposed on an outer peripheral surface of the winding core,
wherein the mass member is adapted to have a higher density of mass at a portion facing to
the at least one permanent magnet than a density of mass at the remainder.

13. The torque rod according to claim 10, wherein one of the elastic bushes has a smaller diameter than that of the other elastic bush, and
the opening of the actuator chamber is located outward from a tangent line passing through the base of the one elastic bush and touching an opening of the other elastic bush.

14. The torque rod according to claim 10, wherein one of the elastic bushes has a smaller diameter than that of the other elastic bush, the one elastic bush has an opening toward the same direction as the actuator chamber, and the other elastic bush has an opening toward a direction perpendicularly to the actuator chamber.

15. The torque rod according to claim 10, wherein one of the elastic bushes has a smaller diameter than that of the other elastic bush
the one and other elastic bushes have openings toward a direction perpendicularly to the actuator chamber, and
the torque rod further comprises a rib disposed at the base of the one elastic bush, and a screw hole for fixing a lid provided in an extension of the rib as viewed from the opening sides of the actuator chamber.

16. The torque rod according to claim 10, wherein the torque rod is to be mounted to a vehicle so that the opening of the actuator chamber faces a hood.

17. The torque rod according to claim 1, comprising: the elastic bushes mounted respectively to the vibration-generating side and the vibration-receiving side, the connecting rod connecting the elastic bushes, and the actuator installed in an actuator chamber formed inside of the connecting rod and reciprocating the mass member in the axial direction,
wherein the actuator chamber has an opening toward an outer surface of the connecting rod, and the opening is located in a region other than a space defined by connecting each of the elastic bushes.

18. An engine mount system for connecting an engine to a vehicle body side by means of the torque rod according to claim 1,
wherein the two elastic bushes have mutually different spring constants, the elastic bush with the smaller spring constant is mounted to an engine-side member, and the elastic bush with larger spring constant is mounted to a vehicle-side member.

19. The torque rod according to claim 1, wherein the connecting member is elastically deformable to urge the mass member in the axial direction of the shaft.

20. The torque rod according to claim 1, wherein the actuator is a linearly movable type actuator, and two pairs of the at least one permanent magnet adjacent to one another are mounted on the inner peripheral surface of the tube-shaped mass member such that the pairs of the at least one permanent magnet are oppositely spaced from the shaft with their polarities reversely oriented to each other.

21. The torque rod according to claim 1, wherein the connecting member consistently connects the at least one end of the mass member to the shaft.

* * * * *